(12) United States Patent
Stone et al.

(10) Patent No.: US 8,120,315 B2
(45) Date of Patent: *Feb. 21, 2012

(54) BATTERY CHARGER WITH MECHANISM TO AUTOMATICALLY LOAD AND UNLOAD BATTERIES

(75) Inventors: Matthew R. Stone, Oxford, MA (US); Leslie J. Pinnell, Framingham, MA (US)

(73) Assignee: The Gillette Company, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/856,063

(22) Filed: Aug. 13, 2010

(65) Prior Publication Data
US 2010/0301804 A1   Dec. 2, 2010

Related U.S. Application Data

(63) Continuation of application No. 11/775,979, filed on Jul. 11, 2007, now Pat. No. 7,800,341.

(60) Provisional application No. 60/896,997, filed on Mar. 26, 2007.

(51) Int. Cl.
*H02J 7/00* (2006.01)
(52) U.S. Cl. .................................. 320/107; 320/106
(58) Field of Classification Search .................. 320/107
See application file for complete search history.

(56) References Cited

U.S. PATENT DOCUMENTS

| | | | | |
|---|---|---|---|---|
| 5,229,703 A * | 7/1993 | Harris | | 320/107 |
| 5,545,967 A | 8/1996 | Osborne et al. | | |
| 5,621,299 A * | 4/1997 | Krall | | 320/103 |
| 5,670,862 A | 9/1997 | Lewyn | | |
| 6,127,804 A | 10/2000 | Oglesbee et al. | | |
| 6,236,186 B1 | 5/2001 | Helton et al. | | |
| 6,534,953 B2 | 3/2003 | Shirakawa | | |
| 6,534,954 B1 | 3/2003 | Plett | | |
| 6,603,284 B2 * | 8/2003 | Peele | | 320/107 |
| 7,071,653 B2 | 7/2006 | Suzuki et al. | | |
| D532,372 S | 11/2006 | Keating | | |
| D532,745 S | 11/2006 | Gaber et al. | | |
| 7,227,336 B1 | 6/2007 | van Schalkwijk et al. | | |
| 2004/0234865 A1 | 11/2004 | Sato et al. | | |
| 2005/0068005 A1 | 3/2005 | Yamashita | | |
| 2005/0194934 A1 | 9/2005 | Iijima et al. | | |
| 2005/0233218 A1 | 10/2005 | Ogawa et al. | | |
| 2005/0244716 A1 | 11/2005 | Ogawa et al. | | |
| 2006/0061330 A1 | 3/2006 | Sato et al. | | |
| 2006/0164035 A1 | 7/2006 | Van Beek et al. | | |
| 2006/0197496 A1 | 9/2006 | Iijima et al. | | |
| 2006/0208695 A1 | 9/2006 | Weinstein et al. | | |
| 2007/0037049 A1 | 2/2007 | Iijima et al. | | |
| 2007/0063669 A1 | 3/2007 | Keating | | |
| 2007/0075682 A1 | 4/2007 | Guang et al. | | |
| 2008/0238356 A1 | 10/2008 | Batson et al. | | |

(Continued)

FOREIGN PATENT DOCUMENTS

JP    2006012613 A    1/2006

(Continued)

*Primary Examiner* — M'Baye Diao
(74) *Attorney, Agent, or Firm* — Fish & Richardson P.C.

(57) ABSTRACT

A mechanism is disclosed for loading/unloading one or more rechargeable batteries. The mechanism includes one or more charging compartments configured to receive one or more rechargeable batteries and a first actuator configured to cause the one or more rechargeable batteries to be displaced from a first position to a second position.

24 Claims, 19 Drawing Sheets

U.S. PATENT DOCUMENTS

| | | |
|---|---|---|
| 2008/0238357 A1 | 10/2008 | Bourilkov et al. |
| 2008/0238359 A1 | 10/2008 | Bourilkov et al. |
| 2008/0238361 A1 | 10/2008 | Pinnell et al. |
| 2008/0238362 A1 | 10/2008 | Pinnell et al. |
| 2008/0238369 A1 | 10/2008 | Cintra et al. |

FOREIGN PATENT DOCUMENTS

| | | |
|---|---|---|
| WO | WO2006097586 A1 | 9/2006 |
| WO | WO2007017164 A2 | 2/2007 |
| WO | WO2007017165 A2 | 2/2007 |

* cited by examiner

BATTERY CHARGER WITH MECHANISM TO AUTOMATICALLY LOAD AND UNLOAD BATTERIES

CROSS-REFERENCE TO RELATED APPLICATIONS

This application is a continuation of and claims priority to U.S. application Ser. No. 11/775,979, filed Jul. 11, 2007, now U.S. Pat. No. 7,800,341 the content of which is incorporated by reference in its entirety, which claims priority from US Provisional Application 60/896,997 filed Mar.26, 2007 entitled: "Battery Charger with Mechanism to Automatically Load and Eject Cells," which is incorporated by reference in its entirety.

BACKGROUND

Typical battery chargers require a user to insert and remove batteries (e.g., rechargeable batteries such as AA or AAA cylindrical rechargeable batteries) manually. Proper battery orientation for such chargers is often confusing for the user. Moreover, insertion or removal of the batteries requires use of force that can sometimes result in accidental damage to the charger. Additionally, the user typically has to periodically check connections between the charger and the battery to ensure that the batteries are being properly charged. Furthermore, if the charger is moved or jostled during the charging operation, the charging operation may be interrupted or otherwise stopped.

SUMMARY

In one aspect, a mechanism for loading/unloading one or more rechargeable batteries, includes one or more charging compartments configured to receive one or more rechargeable batteries and a first actuator configured to cause the one or more rechargeable batteries to be displaced from a first position to a second position.

In another aspect, a mechanism for loading/unloading one or more rechargeable batteries includes one or more charging compartments configured to receive one or more rechargeable batteries, an actuator configured to cause at least a portion of the one or more charging compartments to be displaced from a first position to permit insertion or removal of a battery or batteries into or out of the one or more charging compartments, to a second position in which a charging operation can be initiated.

The following are within the scope of this aspect.

The mechanism includes one or more displaceable contacts configured to be displaced between a contact position with the one or more rechargeable batteries and a non-contact position with the one or more rechargeable batteries and a second actuator configured to cause the one or more contacts to be displaced between the contact and the non-contact positions. The first actuator includes a first cam mechanically coupled to a first set of one or more displaceable arms, and wherein the second actuator includes a second cam coupled to a second set of one or more displaceable arms. The one or more charging compartments are in mechanical communication with the first set of one or more displaceable arms, and wherein the one or more charging compartments are configured to be displaced in response to displacement of the first set of the one or more displaceable arms. The first cam includes a first oblong-shaped disc. The one or more displaceable contacts are in mechanical communication with the second set of one or more arms, and wherein the one or more displaceable contacts are configured to be displaced in response to displacement of the second set of the one or more displaceable arms. The second cam includes an annular disc and a second oblong-shaped disc disposed substantially in the space defined by the annular disc, the annular disc and the second oblong-shaped disc defining a channel configured to receive a cam follower. The mechanism includes a motor, a spur gear, on which the first cam and the second cam are mounted and a worm gear mechanically connected to the motor and in mechanical contact with the spur gear, with the worm gear configured to transfer rotational motion from the motor when the motor is operating on the spur gear.

The first actuator and the second actuator are configured to perform an ordered sequence of actuation operations. The mechanism includes a charging module configured to apply charging current to the one or more displaceable contacts. The mechanism includes a first limit switch configured to cause the motor to stop actuation when the one or more batteries reaches the second position. The mechanism includes a second limit switch configured to cause the motor to stop actuation when the one or more batteries returns to the first position.

In another aspect, a charger device configured to charge one or more rechargeable batteries includes a load/unload mechanism including one or more charging compartments configured to receive one or more rechargeable batteries a first actuator configured to cause at least a portion of the one or more charging compartments to be displaced from a first position to permit insertion or removal of a battery or batteries to a second position in which a charging operation can be initiated; and a controller configured to determine a current level to apply to the one or more rechargeable batteries; and a circuit to apply the determined current level to the one or more rechargeable batteries.

The following are within the scope of this aspect.

The device includes one or more displaceable contacts configured to be displaced between a contact position with the one or more rechargeable batteries and a non-contact position with the one or more rechargeable batteries and a second actuator configured to cause the one or more contacts to be displaced between the contact and the non-contact positions. The first actuator includes a first cam mechanically coupled to a first set of one or more displaceable arms, and wherein the second actuator includes a second cam coupled to a second set of one or more displaceable arms. The one or more charging compartments are in mechanical communication with the first set of one or more displaceable arms, and wherein the one or more charging compartments are configured to be displaced in response to displacement of the first set of the one or more displaceable arms. The one or more displaceable contacts are in mechanical communication with the second set of one or more arms, and wherein the one or more displaceable contacts are configured to be displaced in response to displacement of the second set of the one or more displaceable arms. The device includes a motor, a spur gear, the first cam and the second cam being mounted on the spur gear and a worm gear mechanically connected to the motor and in mechanical contact with the spur gear, with the worm gear configured to transfer rotational motion from the motor when the motor is operating on the spur gear. The first actuator and the second actuator are configured to perform an ordered sequence of actuation operations.

In another aspect, a mechanism for loading/unloading one or more rechargeable batteries includes one or more charging compartments configured to receive the one or more rechargeable batteries, one or more displaceable contacts configured to be displaced between a contact position with the one or more rechargeable batteries and a non-contact position with the one or more rechargeable batteries, a motor, and an actuator coupled to the motor, the actuator configured to cause the one or more contacts to be displaced between the contact and the non-contact positions.

The following are within the scope of this aspect.

The mechanism includes a second actuator coupled to the motor, the second actuator configured to cause at least a portion of the one or more charging compartments to be displaced from a first position to permit insertion or removal of a battery or batteries to a second position in which a charging operation is initiated.

In another aspect, a method for charging one or more rechargeable batteries includes receiving the one or more batteries in corresponding one or more charging compartments such that the one or more batteries are located in a first position, causing the one or more batteries to be displaced from the first position to a second position, determining a current level to apply to the one or more batteries and applying a charging current having substantially the determined current level to the battery.

The following are within the scope of this aspect.

Causing the one or more batteries to be displaced includes actuating a first set of displaceable arms that are in mechanical communication with the one or more charging compartments using a first actuator. The method includes displacing charger contacts configured to electrically couple to terminals of the one or more rechargeable batteries to a positions substantially over the one or more charging compartments. Displacing includes actuating a second set of displaceable arms that are in mechanical communication with the charger contacts using a second actuator.

Disclosed is a mechanism for loading and unloading batteries, such as rechargeable batteries. Also disclosed is a charger device that includes such a mechanism for loading and unloading batteries, such a system is sometimes referred to as a load/eject mechanism. In some embodiments, such a charger device is configured for fast-charge, high current, recharging applications. The disclosed mechanism and device automatically load batteries into charging compartments of the mechanism, commences the charging operation and unloads the batteries upon completion of the charging operation. The mechanism adds a layer of protection to the user when re-charging batteries, especially batteries that charge at a relatively high charge rate such as Li—Fe—P batteries. With such high charge rates the charge amperage is high. By using the automatic load/eject mechanism, 10 there is substantially less chance of the user coming in contact with the contacts that carry the high levels of charging current. The mechanism can be configured to handle a variety of battery types and configurations and allows for ease of use by a consumer or user of the mechanism. The mechanical load/unloading mechanism can be separate of an integral part of the charger circuits.

The details of one or more embodiments of the invention are set forth in the accompanying drawings and the description below. Other features, objects, and advantages of the invention will be apparent from the description and drawings, and from the claims.

DETAILED DESCRIPTION

Electrochemical cells can be primary cells or secondary cells. Primary electrochemical cells are meant to be discharged, e.g., to exhaustion, only once, and then discarded. Primary cells are not intended to be recharged. Primary cells are described, for example, in David Linden, Handbook of Batteries (McGraw-Hill, 2d ed. 1995). On the other hand, secondary electrochemical cells, also referred to below as rechargeable cells or batteries, can be recharged many times, e.g., fifty times, a hundred times, and so forth. Secondary cells are described, e.g., in Falk & Salkind, "Alkaline Storage Batteries", John Wiley & Sons, Inc. 1969; U.S. Pat. No. 345,124; and French Patent No. 164,681, all hereby incorporated by reference.

Figure 1:
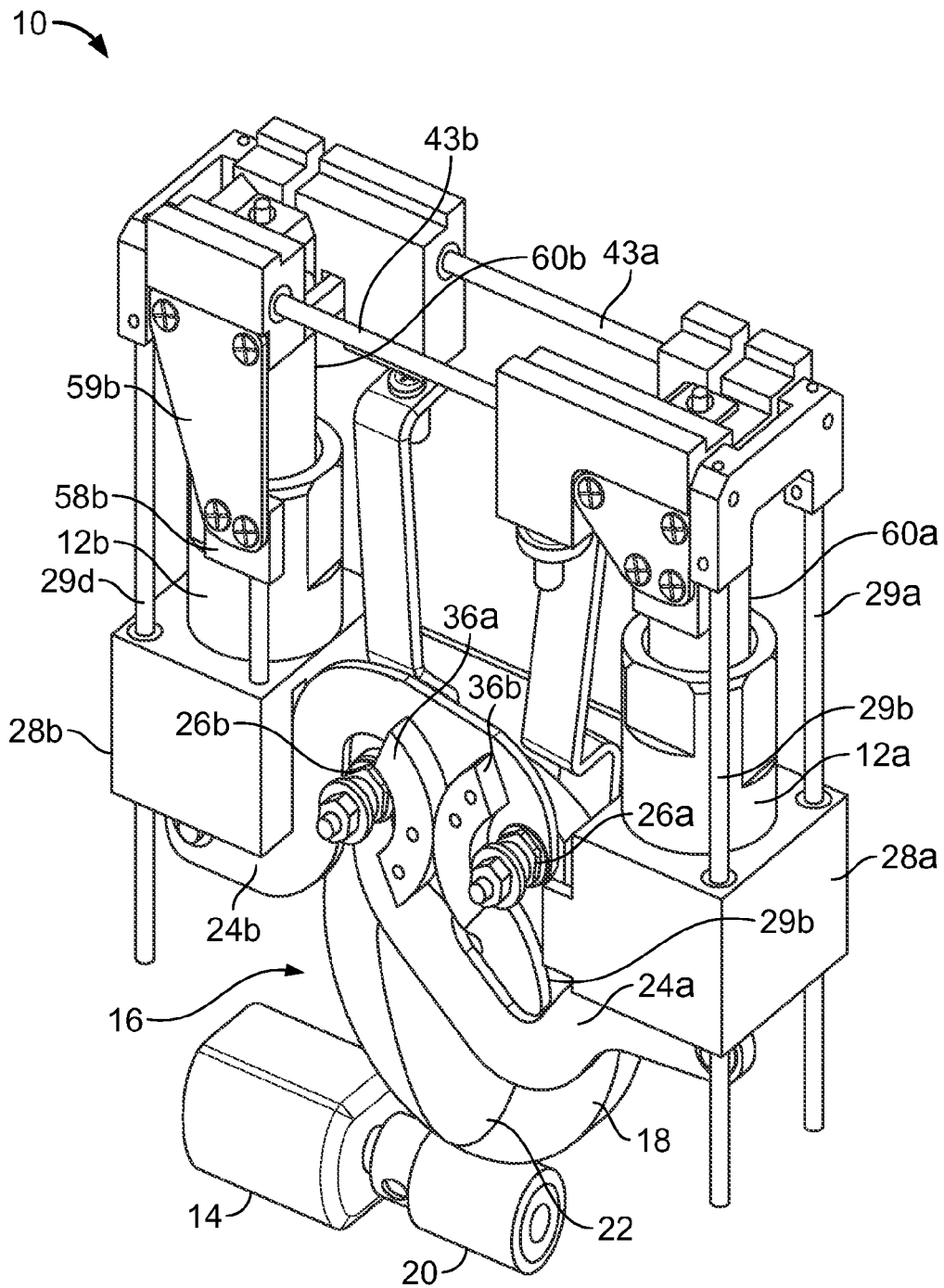
FIG. 1 is a perspective front view of an exemplary embodiment of an automatic load/unload mechanism.

FIG. 1 shows an automatic load/unload mechanism 10 configured to automatically load rechargeable batteries into charging compartments, recharge the batteries while in the charging compartments, and unloads the batteries upon completion of the charging operation such that the batteries can be removed from the mechanism 10.

As shown, the mechanism 10 includes charging compartments 12a and 12b that are configured to receive rechargeable batteries. In some embodiments, a device that includes an automatic load/unload mechanism, such as mechanism 10, may include only one charging compartment, or it may include more than two charging compartments.

In the embodiments described herein, the charging compartments 12a and 12b have a cylindrical structure configured to receive round rechargeable AA and/or AAA batteries including, for example, batteries based on lithium-iron-phosphate electrochemical cells which are adapted, in some embodiments, to be recharged to at least 90% charge capacity in 5-15 minutes. Other batteries based on other cell chemistries can be used including lithium-ion batteries, lead-acid, nickel metal hydride, nickel cadmium, nickel zinc, and silver zinc batteries, and so forth. The charging compartments 12a and 12b may be structured to receive other mechanical configurations for the batteries, including, for example, prismatic batteries, button-cell batteries, and so forth.

The mechanism 10 adds a layer of protection to the user when re-charging batteries, especially batteries that charge at a relatively high charge rate such as Li—Fe—P batteries. With such high charge rates the charge amperage is high. By using the automatic load/eject mechanism, 10 there is substantially less chance of the user coming in contact with the contacts that carry the high levels of charging current.

The load/unload mechanism 10 includes an electric motor 14 that is mechanically coupled to a first actuator 16, via a back-drive resistant worm gear set that includes a disk-shaped spur gear 18 mechanically coupled to the electric motor 14 through a worm gear 20. The electric motor using external AC power source providing power at a rating of, e.g., 96V-220V and 50 Hz-60 Hz, or other geographically suitable rating, a DC power supply, such as a car's DC power supply that supplies 12V DC power, and/or batteries. Other drive mechanisms, e.g., a crank or a spring loaded mechanism, in lieu of a motor may be used. The worm gear 20 is configured to rotate about its central longitudinal axis when the motor 14 is in operation, causing the spur gear 18 to rotate about its center. This type of arrangement is configured to have a high-reduction ratio, thus resulting in high torque. This arrangement is also configured to resist back-driving motion so as to reduce or eliminate the occurrence of unwanted motion when the motor is not in operation.

As shown, the first actuator 16 is configured to displace the batteries and includes a cam drive having a rotatable oblong-shaped plate 22 affixed to the spur gear 18 and two arms 24a and 24b that are secured to the charger housing or enclosure and have a single degree of freedom, i.e. to rotate up and down at respective pivot points 26a and 26b. When the spur gear 18 rotates, the oblong-shaped disc 22 follows the rotational motion of the spur gear 18, while the arms 24a and 24b pivot about the pivot points 26a and 26b. The other two ends of the arms 24a and 24b are in mechanical communication with first and second displaceable stages 28a and 28b on which the charging compartments 12a and 12b are respectively disposed. The displaceable stage 28a is mounted on rod rails 29a and 29b passing through bores defined on the displaceable stage 28a. The displaceable stage 28b is similarly mounted on rod rails 29c and 29d (more clearly shown in FIG. 3) passing through corresponding bores defined on the displaceable stage 28b.

As will become apparent below, rotation of the worm gear 18 and of the oblong-shaped disc 22 imparts motion, e.g., vertical motion, to the arms 24a and 24b, causing the stages 28a and 28b to be vertically displaced along the respective rod rails on which they are mounted, thus changing the vertical positions of the batteries received within the charging compartments 12a and 12b (in some embodiments, the arms 24a and 24b undergo some horizontal displacement as well.)

As shown in FIG. 1, the arms 24a and 24b, which facilitate vertical displacement of the stages 28a and 28b have a generally horizontal orientation. Although FIG. 1 shows an embodiment in which the first actuator 16 causes vertical displacement, in some embodiments the first actuator may cause displacement of the batteries in other directions. For example, in some embodiments, the rechargeable batteries may be inserted from the sides such that the batteries longitudinal axis, when received in the charging compartments, are oriented in a substantially horizontal direction. Under those circumstances, the first actuator could cause horizontal displacement of the rechargeable batteries 60a and 60b. For a horizontal orientation, a magnet may be located in the bottom of the bores of the stages 28a and 28b to prevent the batteries from falling out of the compartments, due to gravity or side-to-side movements of the charger when the batteries are exposed.

Figure 2:
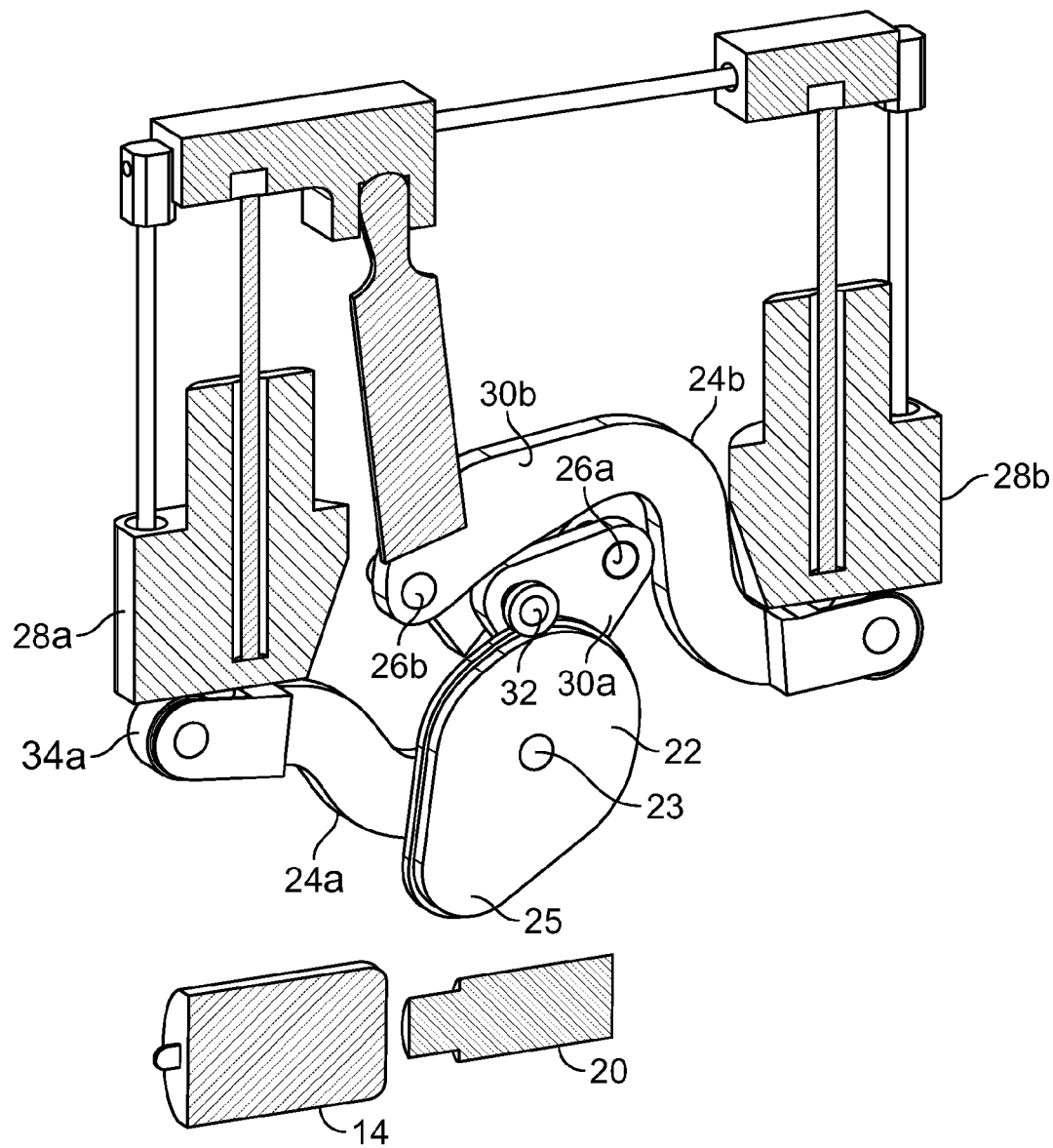
FIG. 2 is a partial perspective view of the first actuator of the mechanism of FIG. 1 configured to control the displacement of batteries.

Referring to FIG. 2, showing a partial back view of the cam drive configured to displace the batteries, an arm end section 30a of the arm 24a which is proximate to the pivot point 26a, includes tire-like cam follower 32 that is in mechanical communication with the oblong-shaped disc 22 (for the sake of clarity, the spur gear 18 has been removed from the view shown in FIG. 2.) As the oblong-shaped disk rotates, the cam follower 32 follows the outer edges of the oblong-shaped disk 22. Because the oblong-shaped disc 22 has a non-uniform radius, as measured from its central pivot point 23 (the pivot point where the oblong-shaped disk is affixed to the spur gear 18), as the cam follower 32 follows the outer edges of the rotating oblong-shaped disc 22, its vertical position will vary, causing it go up and down depending on which point on the outer edge of the oblong-shaped disc 22 the cam follower 32 is in contact with. Thus, when the oblong-shaped disc 22 is rotated so that its tapered end 25 (which has the longest radius from the pivot point 23 of the disc 22) reaches its highest position, i.e., at approximately the so-called "12-o'clock position" in the rotational path of the disc, it will cause the cam follower 32, and the end section 30a of the arm 24a, to be displaced to their highest positions.

As further shown in FIG. 2, attached to the other end of the arm 24a is a rolling interface that includes a roller bearing 34a in mechanical communication with the bottom surface of the stage 28a. The roller bearing 34a is configured to be displaced along the bottom surface of the displaceable stage 28a. In some embodiments, the rolling interface may include other types of sliding mechanisms. When the disc 22 rotates, the cam follower 32 attached to end section 30a of the arm 24a is displaced, causing the arm 24a to be displaced in both vertical and horizontal directions. For example, when the disc 22 rotates so that the tapered end 25 of the disc 22 moves towards its top-most position, it causes the arm 24a to be elevated. As the arm 24a is elevated it pushes the displaceable stage 28a upwards via the roller bearing 34a attached to the arm 22a. Because the arm 24a is pivoting about the pivot point 26a, the elevation of the arm 24a causes the arm 24a to also be displaced horizontally inwardly. The roller bearing 34a attached to the arm 24a thus slides along the bottom surface of the displaceable stage 28a.

Referring back to FIG. 1, attached to the end section 30a of the arm 24a is a crescent or C-shaped gear 36a. The C-shaped gear is in mechanical communication with a symmetrically complementary C-shaped gear 36b that is attached to an end section 30b of the arm 24b such that the respective open-ends of the gears 36a and 36b face in opposite directions. When the end section 30a of the arm 24a moves in a generally radial path, the C-shaped gear 36a secured thereto moves in the same direction. As a result, the motion of the C-shaped gear 36a causes the C-shaped gear 36b to move in a generally symmetrically opposite radial path. For example, when the C-shaped gear 36a moves in a generally clockwise direction, it actuates C-shaped gear 36b to move in a generally counter-clockwise direction.

The C-shaped gear 36b is secured to the arm 24b. Attached to the end section of the arm 24b underneath the displaceable stage 28b is a rolling interface that includes a roller bearing 34b similar to the roller bearing 34a. The roller bearing 34b is configured to be displaced along the bottom surface of the displaceable stage 28b when the arm 24b is moving. Thus, when the arm 24a is actuated to be vertically displaced via the cam follower 32, it actuates the arm 24b to similarly be vertically displaced via the interaction between the C-shaped gears 36a and 36b that are attached to respective end sections of 30a and 30b of the arms 24a and 24b. Consequently, as the arm 24b is vertically displaced, it vertically displaces, via the roller bearing 34b, the displaceable stage 28b.

Figure 3:
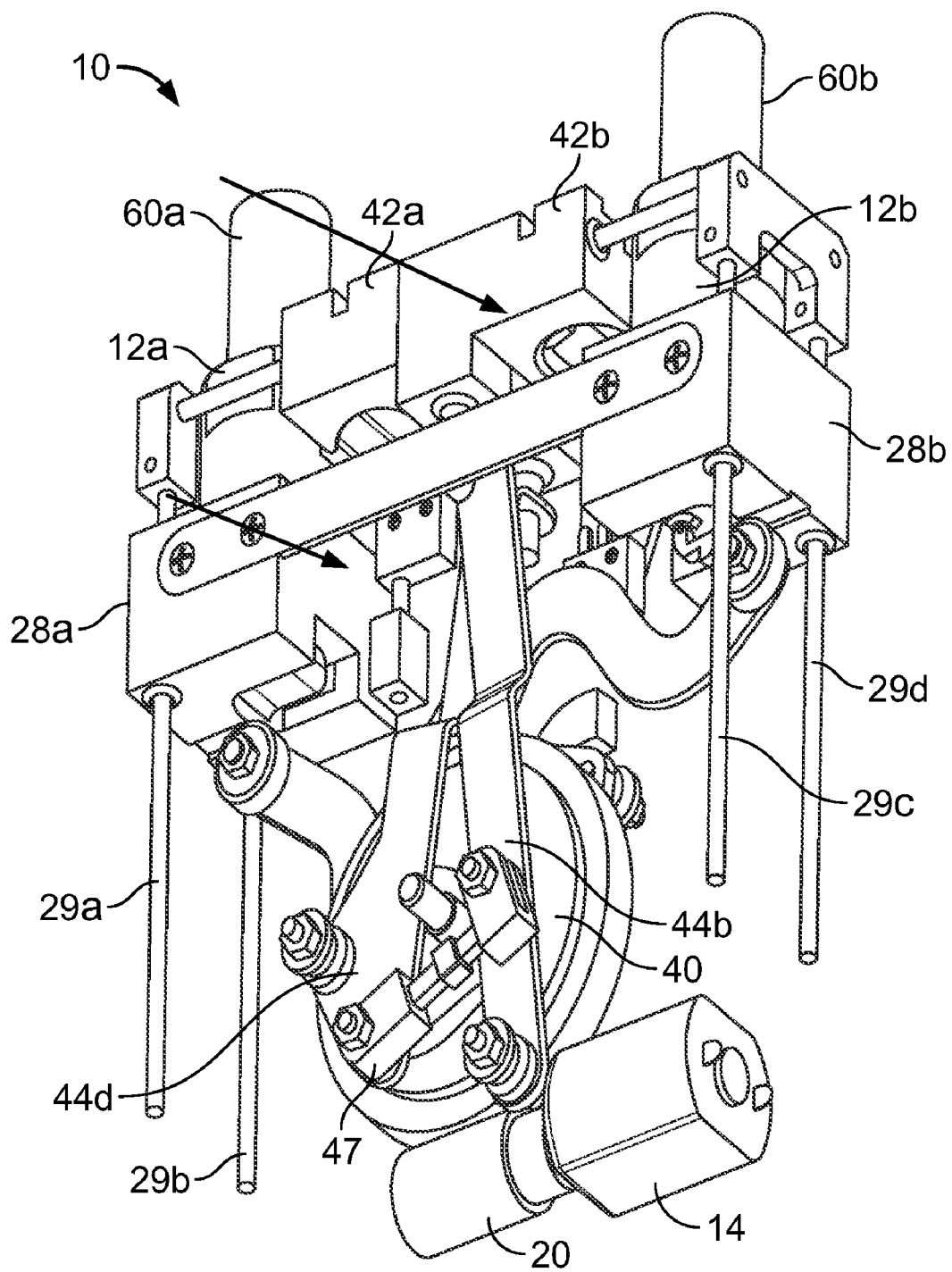
FIG. 3 is a perspective back view of the mechanism of FIG. 1.

Referring to FIG. 3, the load/unload mechanism 10 includes a second actuator 40 configured to control displacement of charger contacts 42a, 42b that electrically couple to terminals of the batteries received within the charging compartments 12a and 12b. The charger contacts are also electrically coupled to a charging circuit that provides a charging current applied, via the electrical contacts, to the batteries. In the embodiment shown in FIG. 3, the second actuator moves charger contacts 42a and 42b horizontally to permit insertion of the batteries into the charging compartments. The second actuator 40 is disposed on the side of the spur gear 18 that is opposite the side on which the first actuator 16 is disposed. The charger contacts 42a and 42b are mounted on rod rails 43a and 43b (shown in FIG. 1) that pass through longitudinal bores located proximate the sides of the charger contacts 42a and 42b. The charger contacts 42a and 42b are thus configured to be slideably displaced along the rod rails 43a and 43b. The charger contacts 42a and 42b may include, for example, commercially available nickel plated cold-rolled steel spring contacts. The horizontal positions of the charger contacts 42a and 42b are controlled using two arms 44a and 44b, positioned in a general vertical orientation, that are attached to the charger contacts 42a and 42b.

In the depicted embodiment for cylindrical batteries, it is understood that charger contacts 42a and 42b respectively contact, e.g., the positive terminals of the batteries 60a and 60b, with the negative terminals of those batteries contacting contacts (not shown) disposed at the bottom of the charging compartments. On the other hand for a prismatic battery the contacts 42a and 42b would carry both positive and negative contacts (not shown) and contact the corresponding terminals on the prismatic battery. Other types of prismatic batteries, which have contacts at ends of the battery, like cylindrical batteries can be accommodated in a similar manner as the cylindrical batteries.

Figure 4:
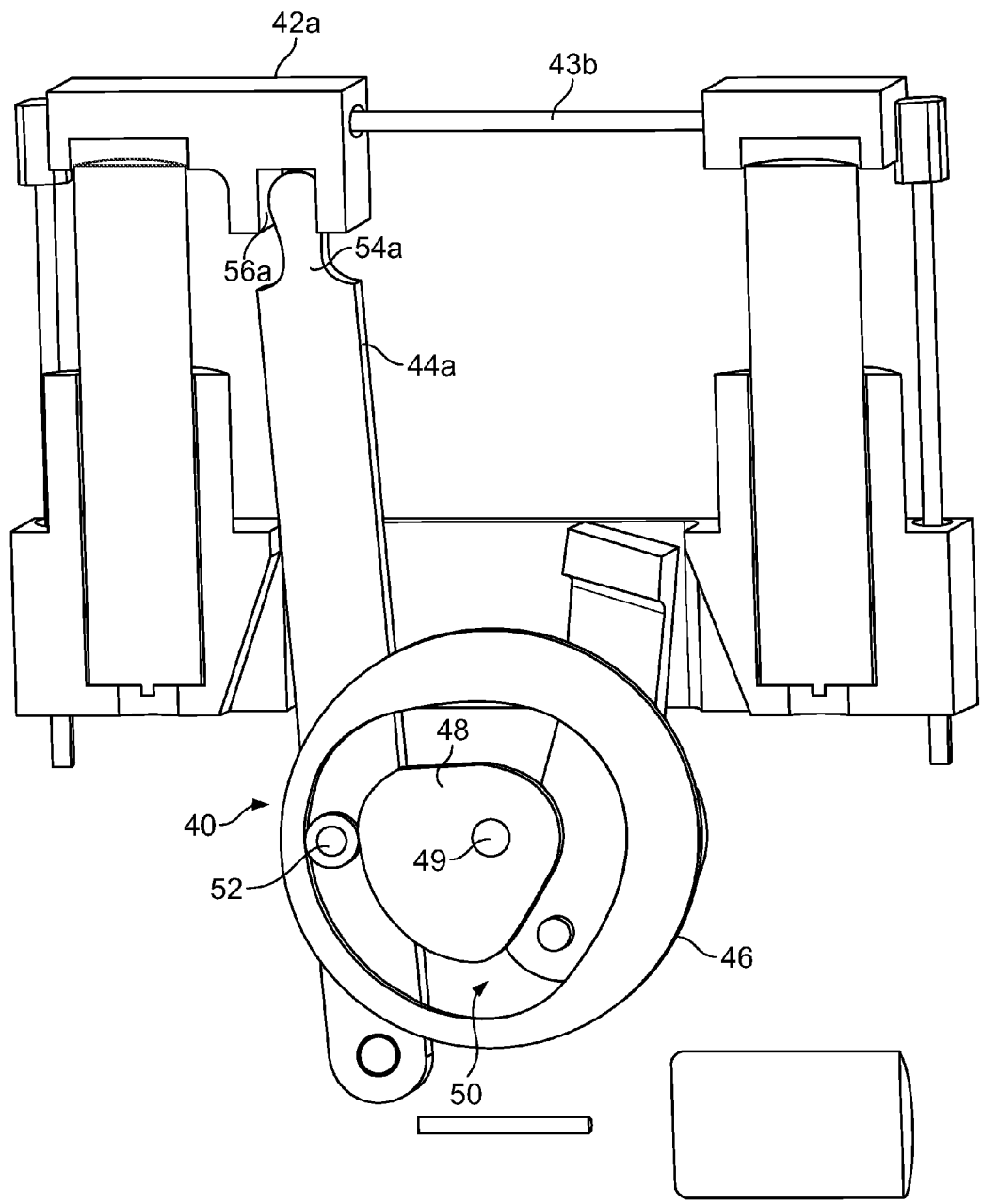
FIG. 4 is a partial perspective view of the second actuator configured to control the displacement of charger contacts.

Referring to FIG. 4, the actuator 40 is a closed-form cam drive that includes an annular disc portion 46 and an oblong-shaped disc portion 48 disposed substantially in the middle of the annular disc portion 46 (for the sake of clarity, various elements of the load/unload mechanism 10, such as the spur gear 18, are not shown in the partial view of FIG. 4.) The oblong-shaped disc portion 48 is secured to the spur gear 18 such that when spur gear rotates, the oblong-shaped disc portion rotates about a pivot point 49. The oblong-shaped disc portion 48 is secured to the spur gear 18 at the pivot point 49.

Disc portion 48 and annular disc portion 46 can be provided as one piece. The disc portion 48 starts out as a solid. The cylindrical and oblong 'racetrack' grooves are machined into one side. It is shown as cut away in FIG. 4, to illustrate the follower and thus appears as two pieces in the figure. Annular disc portion 46 and the oblong-shaped disc portion 48 (hereinafter annular disc 46 and the oblong-shaped disc 48) are implemented as one piece and they are joined to the spur gear 18 and rotate about the pivot point 49.

The annular disc 46 and the oblong-shaped disc 48 disposed therein define a "race-track" channel 50. Disposed inside the race-track channel 50 is a tire-like cam follower 52 that is configured to follow the oblong-shaped disc 48 inside the channel 50 as the oblong-shaped disc 48 rotates. As further shown in FIG. 4, the cam follower 52 is secured to the arm 44a so that when the cam follower 52 is displaced by the rotating oblong-shaped disc 48, the arm 44a is horizontally displaced. The arm 44a includes a tip 54a that is received in a bore 56a extending from the bottom surface of the charger contact 42a. When the arm 44a is actuated by the oblong-shaped disc 48 acting on the cam follower 52, the arm 44a is displaced horizontally (the arm 44a also undergoes some vertical displacement) and thus causes the charger contact 42a to slide horizontally along the rail rods 43a and 43b.

Referring back to FIG. 3, the arms 44a and 44b are attached to each other through a push-pull rod 57. Thus, the displacement of the arm 44a, through actuation by the oblong-shaped disc 48 acting on the cam follower 52, causes the arm 44b to be displaced. For example, when the arm 44a is actuated to be horizontally outwardly displaced, the arm 44b is actuated, through the push-pull rod 57, to be horizontally outwardly displaced in the opposite direction.

As will become apparent below, in some embodiments, the first and second actuators are configured to implement a mechanical timing mechanism that causes displacement of the respective arms coupled to the actuators in a particular order. Particularly, in some embodiments, the second actuator 40 is configured such that, for example, the arms 44a and 44b are not displaced into a closed position over the received batteries until after the first actuator 16 has caused the arms 24a and 24b to displace the displaceable stages 28a and 28b to their low position. In other words, the actuators 16 and 40 cause displacement of the respective arms they actuate at different times, thus enabling an ordered sequence of operations in which batteries are lowered, and the charger contacts 42a and 42b are then displaced over the lowered batteries. After the charging operation is completed, the second actuator 40 causes the charger contacts to open, and the first actuator 16 subsequently elevates the displaceable stages 28a and 28b to enable removal of the thus charged batteries.

In some embodiments, this type of ordered sequence of operations may be implemented by aligning the respective oblong-shaped discs of the actuators 16 and 40 so that their tapered ends are in different radial positions (i.e., they are out of phase with respect to each other). Thus, when the spur gear 18, to which both the oblong-shaped discs 22 and 48 are secured, begins to rotate, one oblong-shaped, e.g., disc 22, will cause actuation of the arms 24a and 24b, while, at the same time, the other rotating oblong-shaped disc 48 is traveling in a radial section of its path in which it does not cause significant displacement of the arms it operates on. Configuring the actuators 16 and 40 to implement a mechanical timing mechanism reduces of the likelihood of accidental arms malfunction due to, for example, entanglements of the respective arms actuated by the actuators 16 and 40.

FIGS. 5-9 show the load/unload mechanism 10 in operation.

Figure 5A:
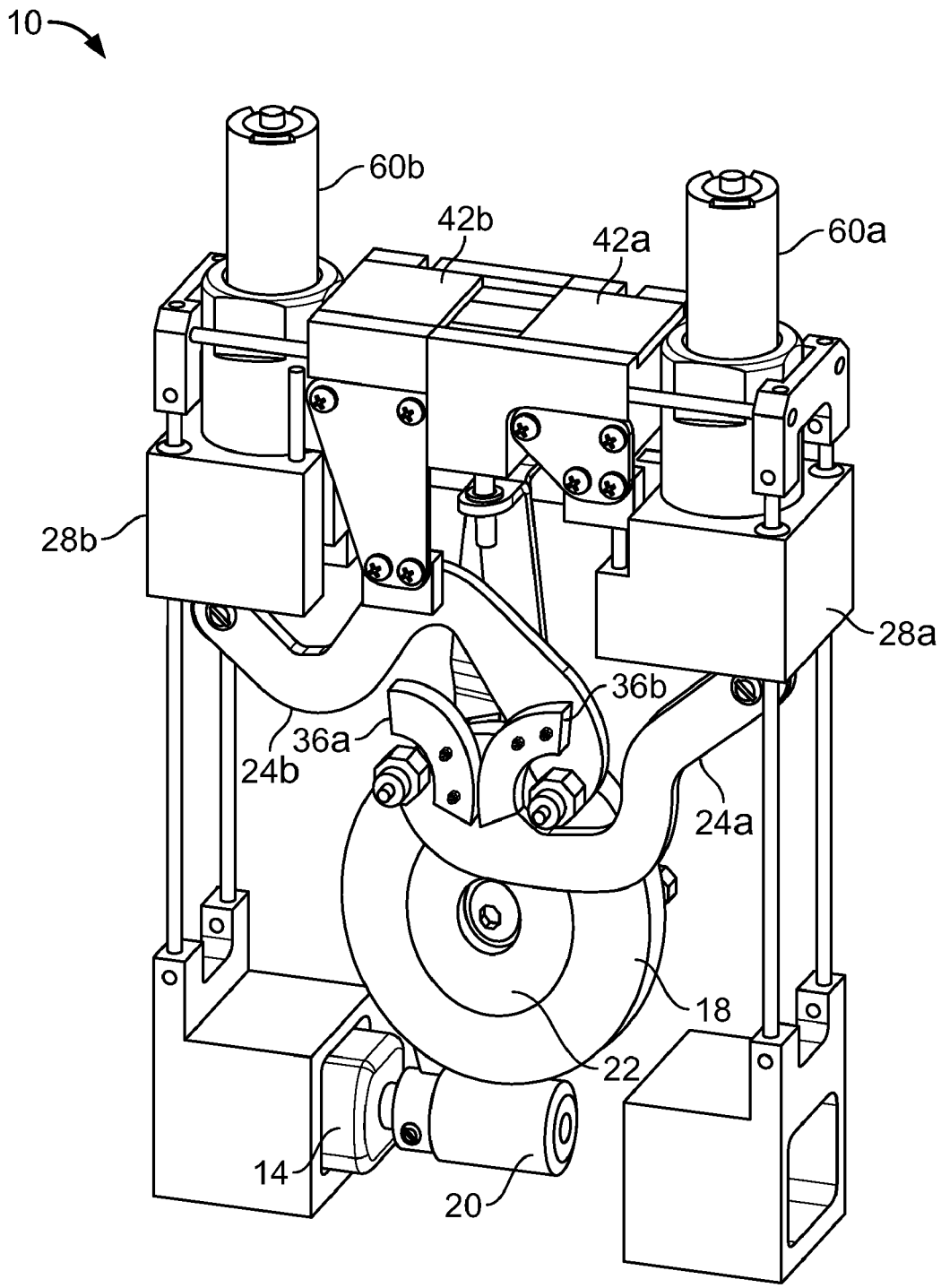
FIGS. 5A-B are perspective front and back views of the mechanism of FIG. 1 in operation, showing batteries being placed into the charger from the top.
Figure 5B:
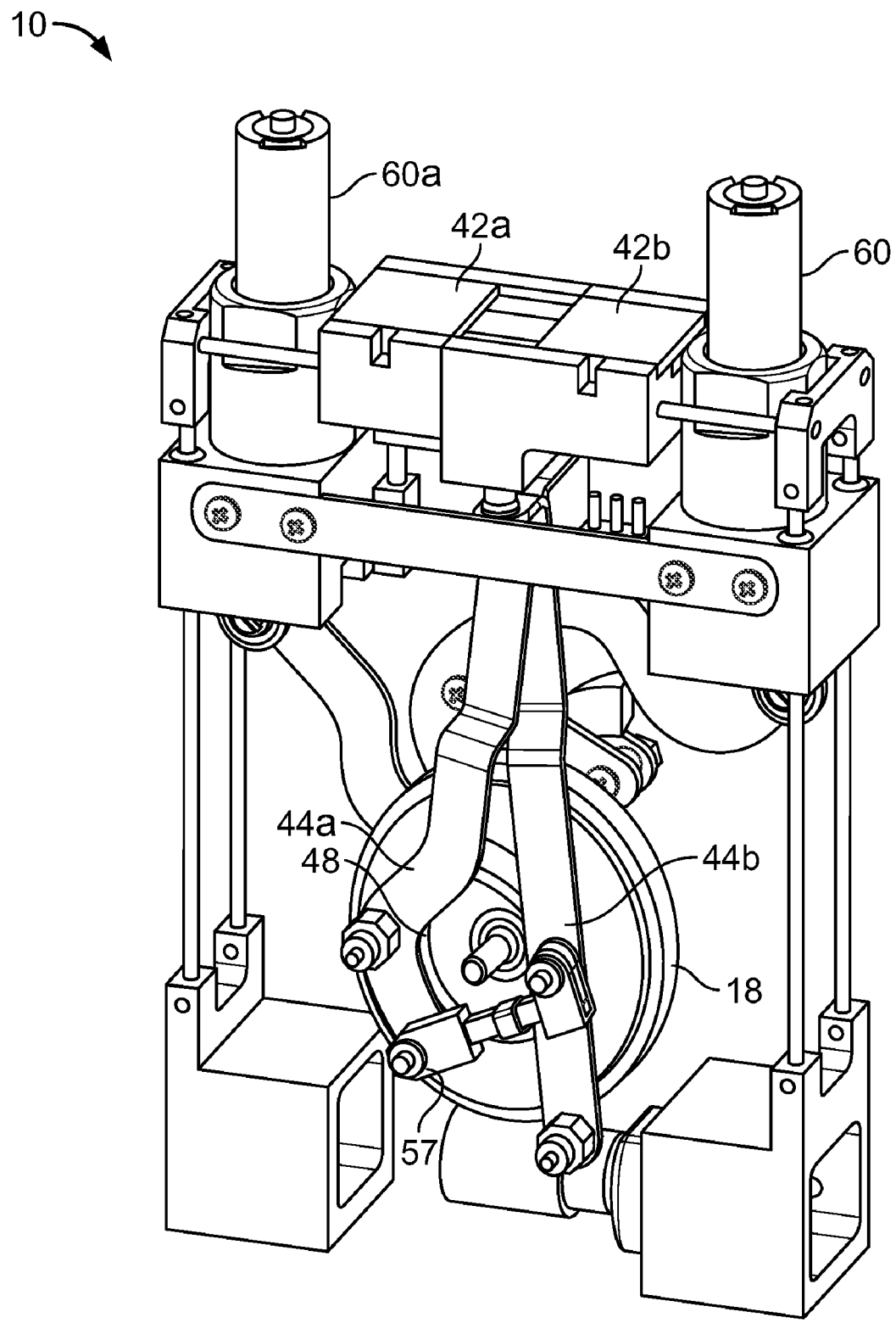

Referring to FIGS. 5A and 5B, two batteries 60a and 60b are inserted into the charging compartments 12a and 12b, respectively. In the battery-load position, the oblong-shaped disc 22 (shown in FIG. 5A) is oriented so that the tapered end 25 is substantially at the top-most position of its rotational path. Thus, the arms 24a and 24b, actuated by the disc 22 via the cam follower 32, secured to the arm end 30a and the C-shaped gears 36a and 36b, are extended such that stages 28a and 28b are at their top-most positions.

As shown in FIG. 5B, the oblong-shaped disc 48 of the actuator 40 is oriented so that the tapered end of the disc 48 is substantially at the 10-o'clock position of its rotational path such that the end section of the arms 44a and 44b secured to the battery covers 42a and 42b are in their inwards most position, thus allowing the covers to converge substantially in the middle of the rails 43a and 43b, thus opening the charging compartments to received the batteries 60a and 60b. As shown, the respective tapered ends of the oblong-shaped discs 22 and 48 are in different radial positions along the rotational paths that the discs follow, which enables the mechanism 10 to implement an ordered actuation sequence as will become apparent.

Figure 6A:
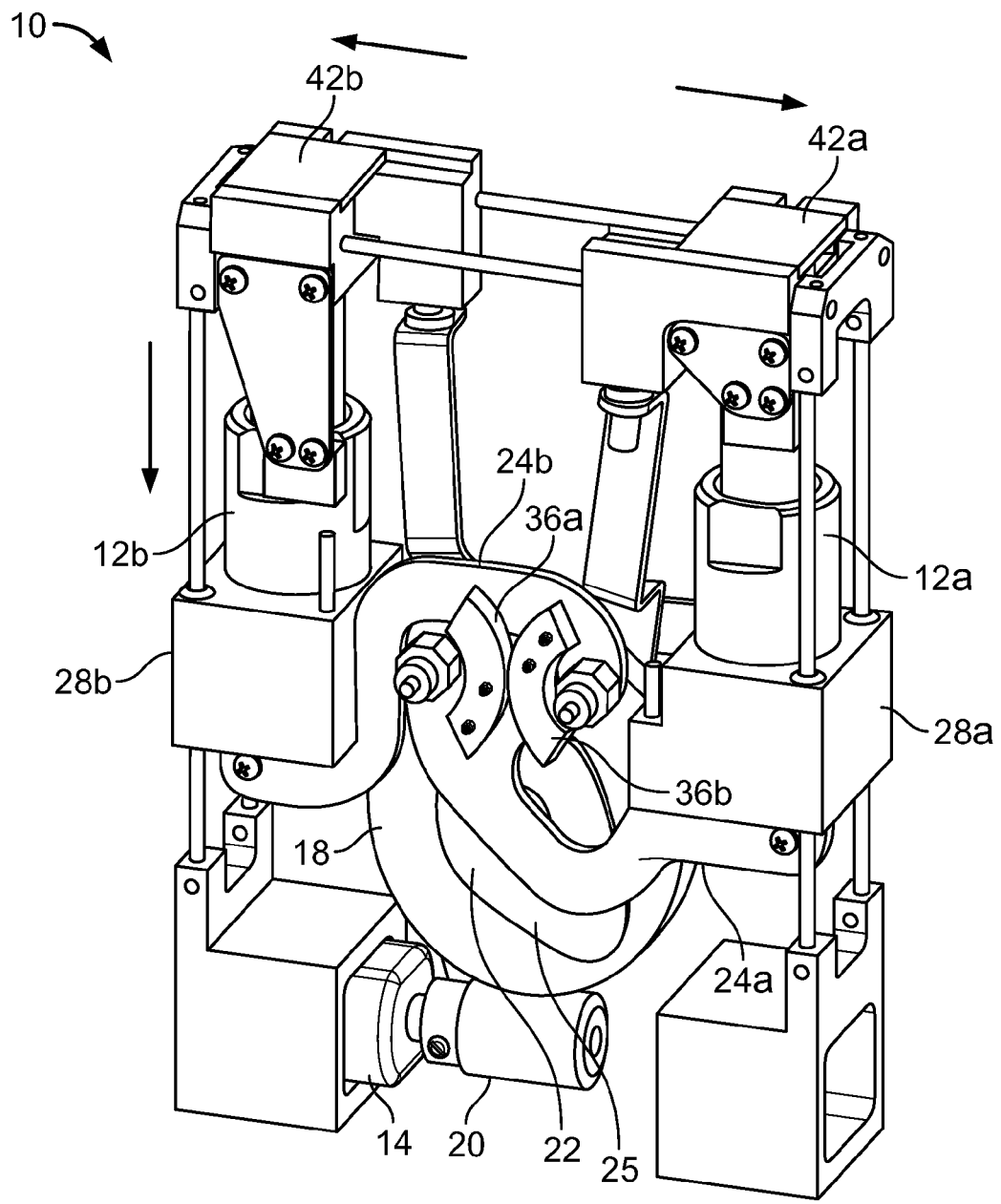
FIG. 6A-B are perspective front and back views of the mechanism of FIG. 1 in operation, showing the batteries being displaced into the charging compartments of the charger and contacts of the charger sliding over the charging compartments.
Figure 6B:
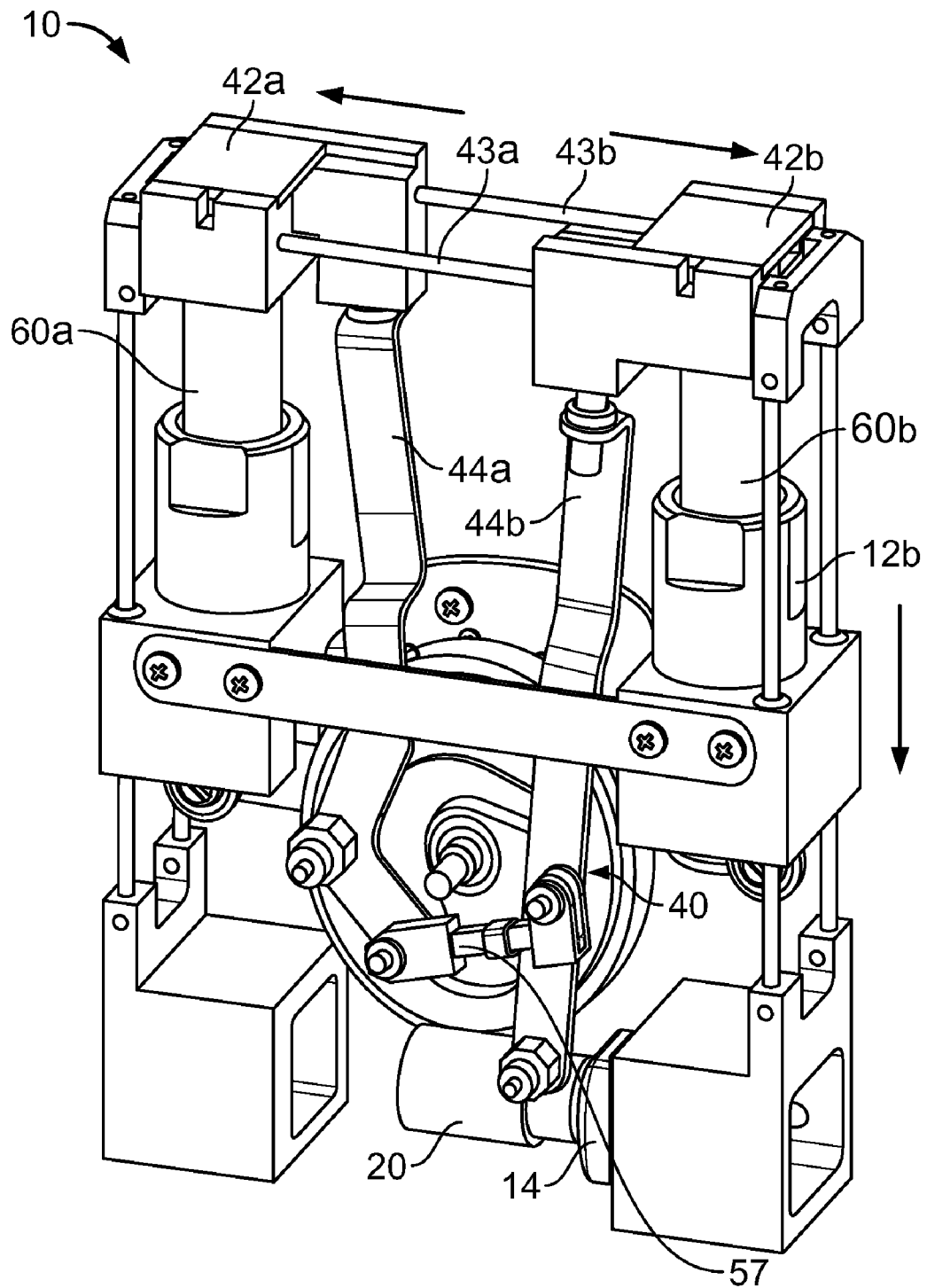

Referring to FIGS. 6A and 6B, upon initiation of the charge cycle (e.g., by a user pressing a 'START' button located, for example, on the external casing of the charger device in which the load/unload mechanism is disposed, or by a controller module responding to a sensor indication that batteries have been received in the charging compartments), the electric motor 14 begins to operate causing the worm gear 20 and the spur gear 18 to rotate. The spur gear rotates clockwise (as viewed from the front view of FIG. 6A whereas, the oblong-shaped disc 22 secured to the spur gear 18 rotates to a radial position in which the tapered end 25 of the disc 22 is approximately 45° from the bottom-most position of its radial path (i.e., the tapered end is at the approximate '4-o'clock' position of its radial path). At that position, the cam follower 32 attached to arm end section 30 of the arm 24a will have been actuated to a position in which it will be in mechanical contact with a section of the disc 22 that is proximate to the wide end of the disc 22. Points at or near the wide end of the oblong-shaped disc 22 have shorter radii to pivot point 23 of the disc 22 compared to the radius measured from the tapered end 25 of the disc. Thus, the cam follower 32 will be substantially at the bottom-most position it can attain, and consequently, the arm 24a will have been actuated to its lowest vertical position. Additionally, the C-shaped gear 36a attached to the arm 24a will have rotated clockwise, thus causing the C-shaped gear 36b, attached to the arm 24b, to be rotated counter-clockwise, thus actuating the arm 24b to its lowest vertical position. As a result, the stages 28a and 28b will have been displaced to their lowest vertical position, thus causing the batteries 60a and 60b received within the charging compartments 12a and 12b to be lowered.

Referring to FIG. 6B, showing the back view of the load/unload mechanism shown in FIG. 6A, the cam driver 40, which includes the 'race-track' channel 50 defined by the oblong-shaped disc 48 and the annular disc 46, is oriented so that the tapered end of the oblong-shaped disc 48 and of the channel 50 is substantially at the '3-o'clock' position of the rotational path of the oblong-shaped disc 48. At that position, the cam-follower 52 attached to the arm 44a will be at its farthest position from the pivot point 23, and thus will have actuated the arm 44a to its outward-most horizontal position. As a result, the charger contacts 42a will be at its outward-most horizontal position, where it is placed substantially above the charging compartment 12a. Actuation of the arm 44a to its outward-most horizontal position will actuate the arm 44b, through the push-pull rod 57, to its outward-most horizontal position, and thus the charger contact 42b will be at a position substantially above the charging compartment 12b.

When the batteries 60a and 60b have been lowered to their lowest position, they will generally be out of view.

In some embodiments, the load/unload mechanism 10 is configured to avoid excessive side loading of the battery/contact interface. Specifically, the actuator used to control the vertical displacement of the stages 28a and 28b actuates the arms 24a and 24b to slightly displace the stages 28a and 28b upwards after the charger contacts 42a and 42b have been displaced to a position above the charging compartment 12a and 12b.

Figure 7A:
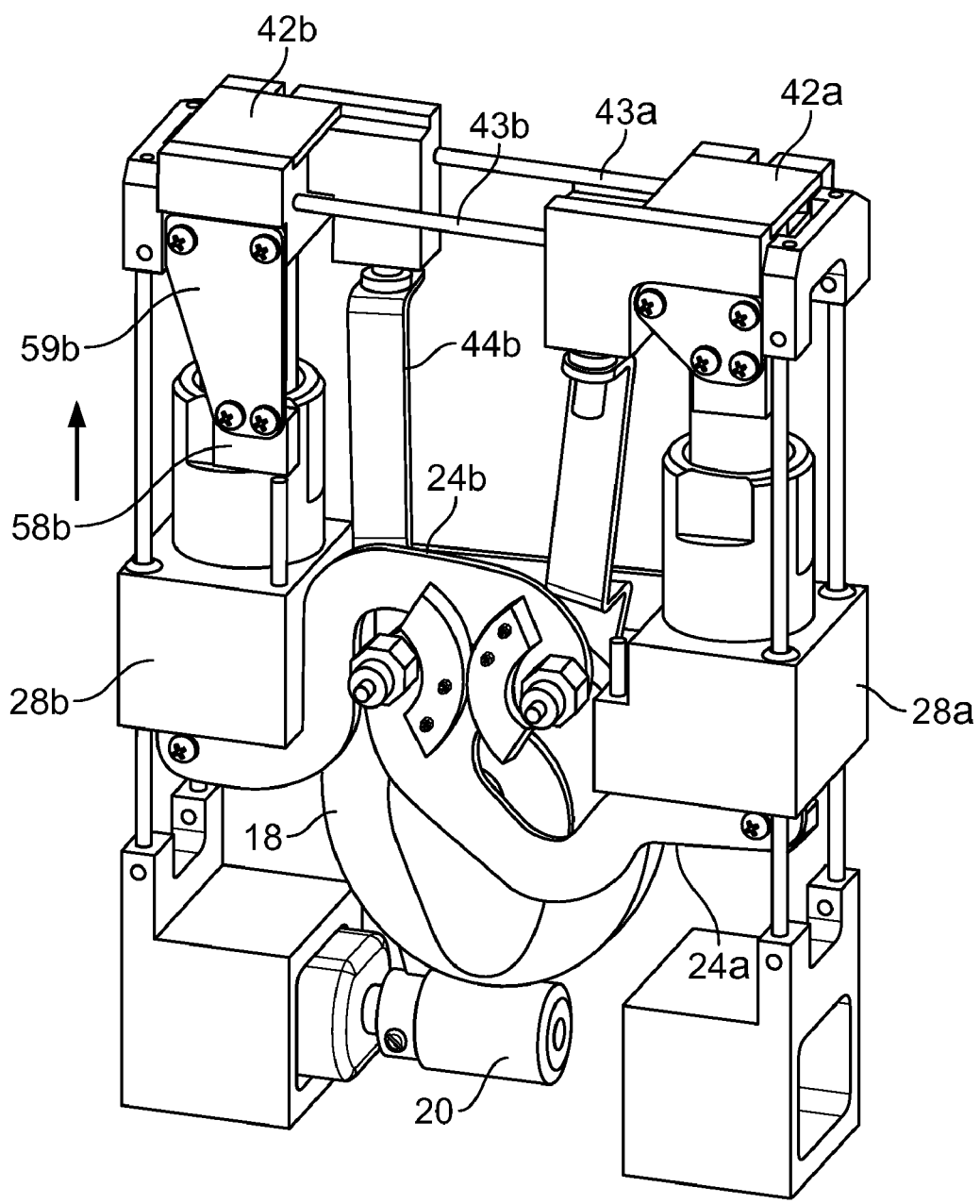
FIGS. 7A-B are perspective front and back views of the mechanism of FIG. 1 in operation, showing the batteries being displaced towards the contacts.

Referring to FIG. 7A, the oblong-shaped disc 22 rotates further in a clockwise direction to a position in which the tapered end 25 of the disc 22 is substantially at its lowest-most position (i.e., substantially the '6-o'clock' position.) At that position, the cam follower 32 will have been actuated to a vertical position that is slightly higher than the position attained when the tapered end 25 of the oblong-shaped disc 22 was substantially at the '4-o'clock' position, and likewise the arm 24a will also be actuated to a vertical position higher than it had when the tapered end 25 was at the '4-o'clock' position.

Figure 7B:
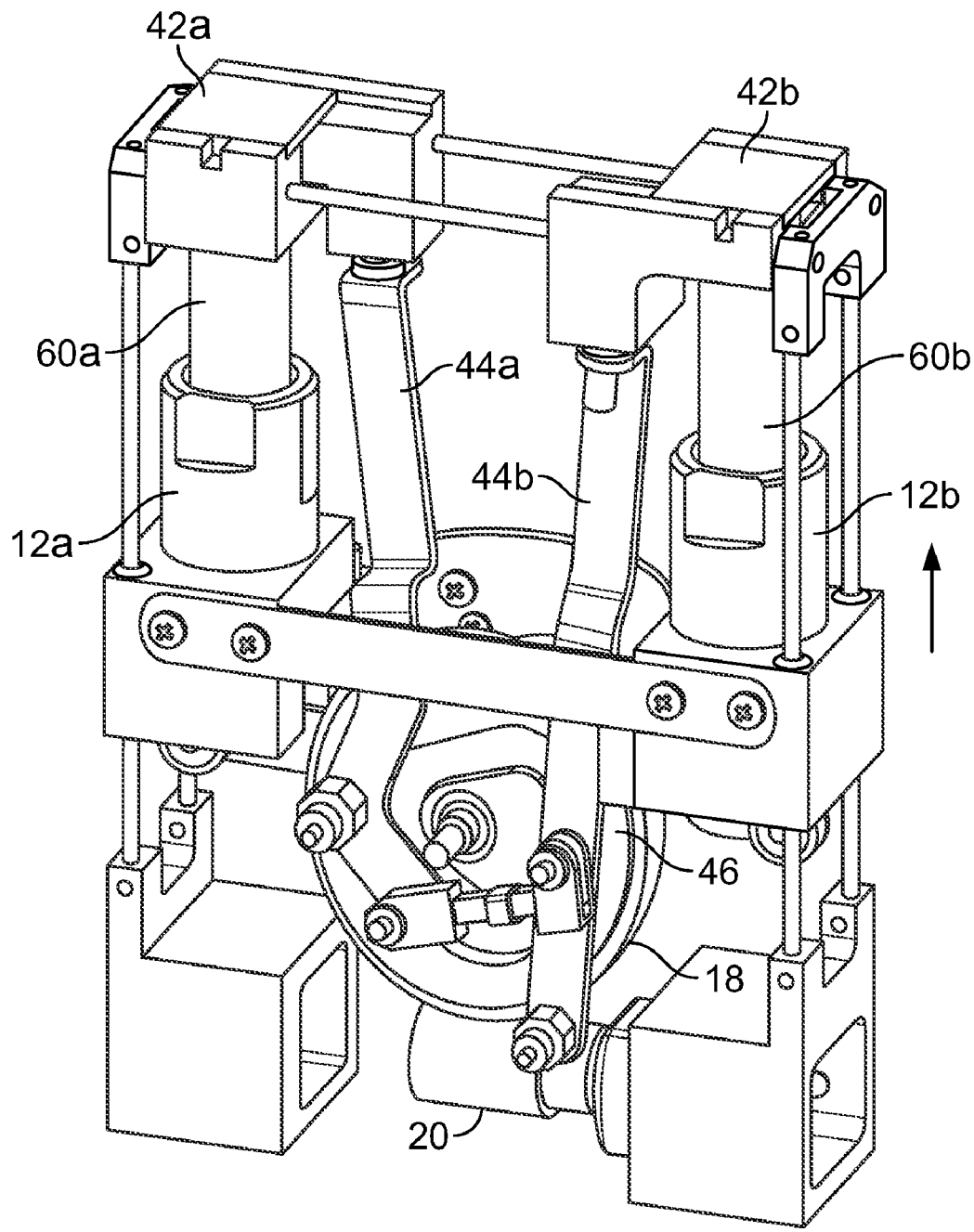

Referring to FIG. 7B, the rotation of cam driver 40 controlling the horizontal displacement of the charger contacts 42a and 42b will cause minor changes in horizontal displacement of the covers 42a and 42b, but the battery covers will generally remain substantially above the charging compartments 12a and 12b. The covers 42a and 42b are stationary above the batteries when they move upward to make contact.

As the batteries rise to make electrical and mechanical contact with the contacts 42a and 42b, the rim of the charging compartment 12b will come in contact with a 'charge position' electromechanical limit switch 58b that is secured to a tab 59b extending from the side of the battery cover 42b (see also FIG. 1.) The mechanical contact between the rising charging compartment 12b and the limit switch 58b will cause the limit switch 58b to produce a signal that is provided either directly to the motor 14, or to a controller 80 (shown in FIG. 11), that is configured to control the motor 14, including causing the motor 14 to stop its operation, and thus cease actuation of the stages 28a and 28b and of the charger contacts 42a and 42b. When the motor 14 has ceased its operation the charging procedure, described in greater detail below, is commenced.

Figure 8A:
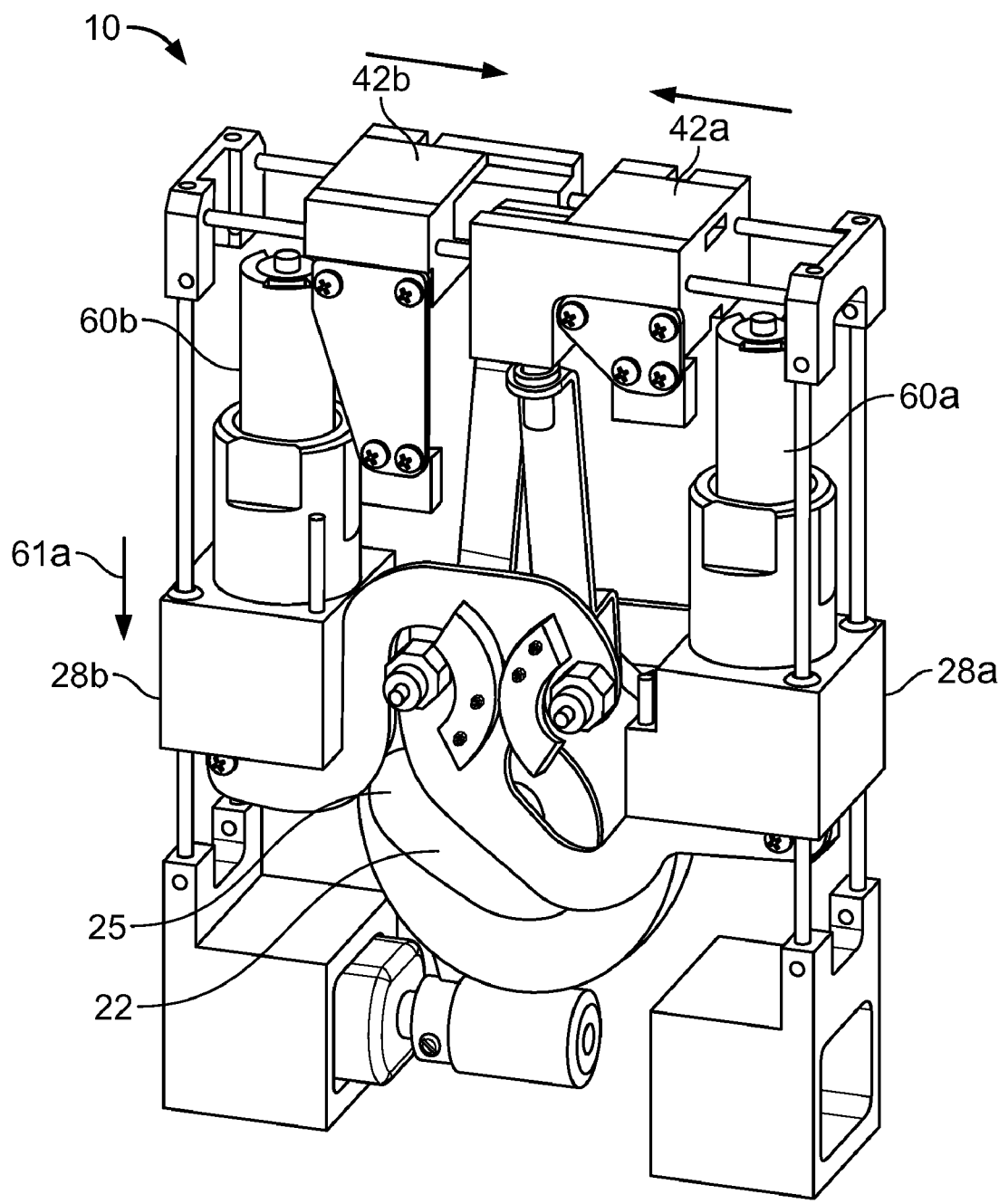
FIGS. 8A-B are perspective front and back views of the mechanism of FIG. 1 in operation, showing the contacts retracting inwardly to expose the openings of the charging compartments.

Referring to FIG. 8A, after the charging procedure has been completed, the motor 14 is re-started, for example, by having the controller 80 send control signals to cause the motor 14 to resume its operation. The oblong-shaped disc 22 resumes its rotation and actuates the cam follower 32, and thus the arm 24a, to cause the stages 28a and 28b to be slightly displaced vertically downwards.

The oblong-shaped disc 22 rotates to a position in which its tapered end 25 is between the '9-o'clock' and '10-o'clock' radial position, in which the cam follower 32 is resting at a vertical position that is lower than that at which the cam follower 32 was when the tapered end 25 of the disc 22 was at the 6-o'clock position. Consequently, the stages 28 and 28b, as well as the batteries 60a and 60b will be moved to a lower vertical position than when charging was performed, as indicated by the arrows 61a and 61b. By lowering the stages 28a and 28b, and thus lowering the batteries 60a and 60b, the batteries terminals disengage from the contacts 42a and 42b, thus enabling the contacts 42a and 42b to retract from their position over the charging compartments 12 and 12b without being damaged.

Figure 8B:
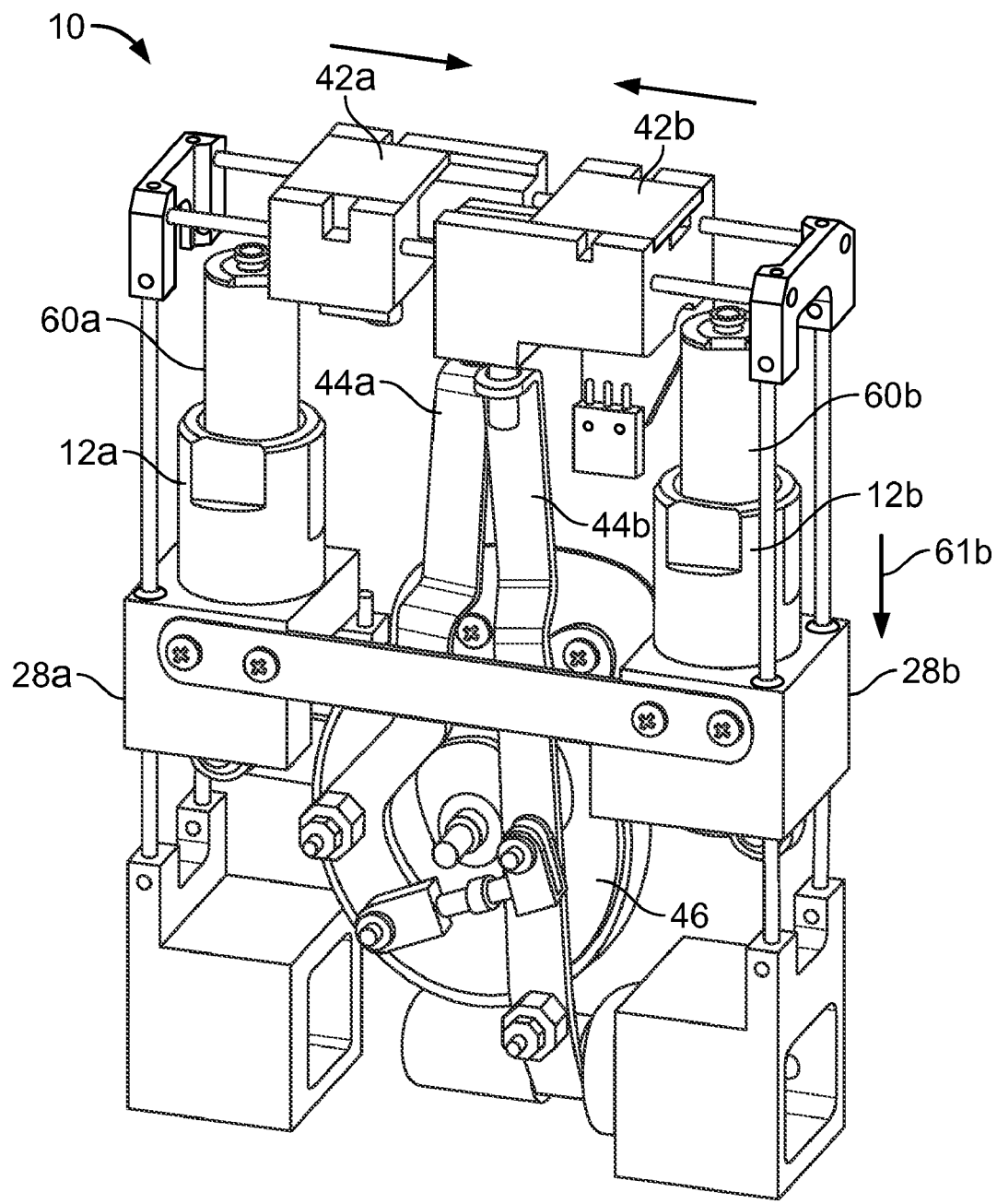

Referring to FIG. 8B, resuming the operation of the motor 14 also causes cam driver 40 to resume its rotation, thus causing actuation of the arms 44a and 44b, via the cam follower 50a secured thereto, to an inward horizontal position.

During the actuation of the arms 44a and 44b, the cam follower 32 follows the edges of the oblong-shaped disc 22 as the disc 22 is traveling through a portion of its radial path that does not result in significant vertical displacement of the cam follower 32, and therefore does not result in a significant vertical displacement of the stages 28a and 28b. Consequently, the stages 28a and 28b will undergo most of their upwards vertical displacement after the charger contacts 42a and 42n have been substantially retracted to approximately the center of the rod rails 43a and 43b.

Figure 9A:
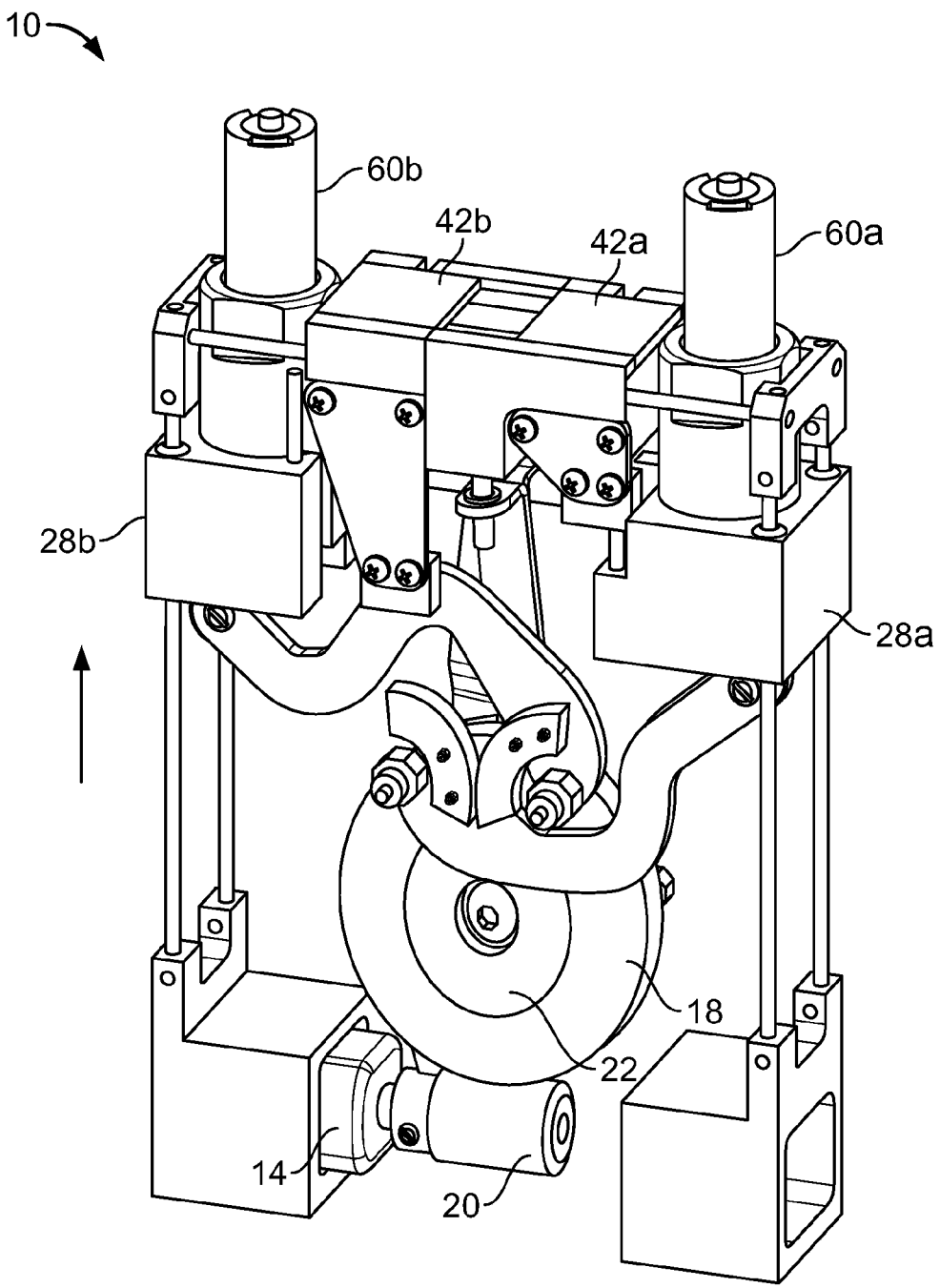
FIGS. 9A-B are perspective front and back views of the mechanism of FIG. 1 in operation, showing the charging compartments and the batteries disposed therein moving upwards to the 'unload' position.
Figure 9B:
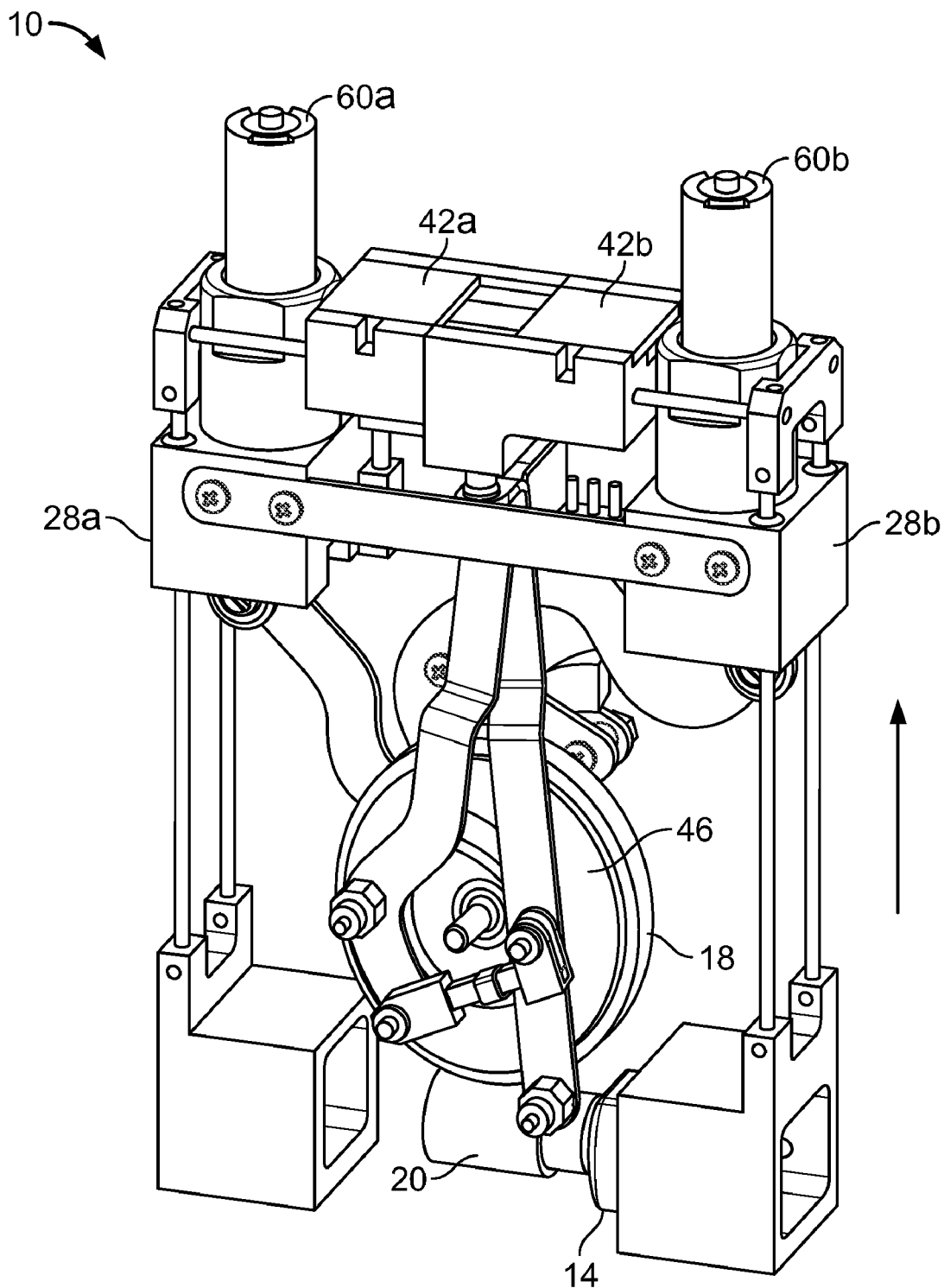

Referring to FIGS. 9A and 9B, when the charger contacts 42a and 42b have substantially fully retracted to the center of the rod rails 43a and 43b, the batteries 60a and 60b are actuated to move upward to the removal position. As shown, the oblong-shape disc 22 completes its radial path and returns to the position in which the tapered end 25 of the disc 22 is at its top-most position (i.e., substantially at the 12-o'clock position). As a result, the cam follower 32 will be at substantially the farthest point from the pivot point 29 of the oblong-shaped disc 22, and consequently, the arms 24a and 24b will have been actuated to their upwards-most vertical displacement, causing the stages 28a and 28b to be elevated, and the batteries 60a and 60b to be exposed. When the oblong-shaped disc 22 reaches the radial position in which the tapered end 25 is at the 12-o'clock position, an 'unload' limit switch 58a is engaged and the motor is stopped.

As shown in FIG. 9A, the unload switch 58a is mounted in the upper right hand corner of the mechanism as viewed in FIG. 9A. A plate 59a mounts the 'eject' switch to the contact 42a. A threaded rod 59b is mounted to the bottom of the stage 28a which depresses (actuates) the switch 58a when batteries reach the eject position. The rod 59b and the switch 58a come in proximity to each other when the contacts 42a and 42b are in the centered position and the battery stages 28a and 28b are in the 'eject' or 'unload' position.

Figure 10A:
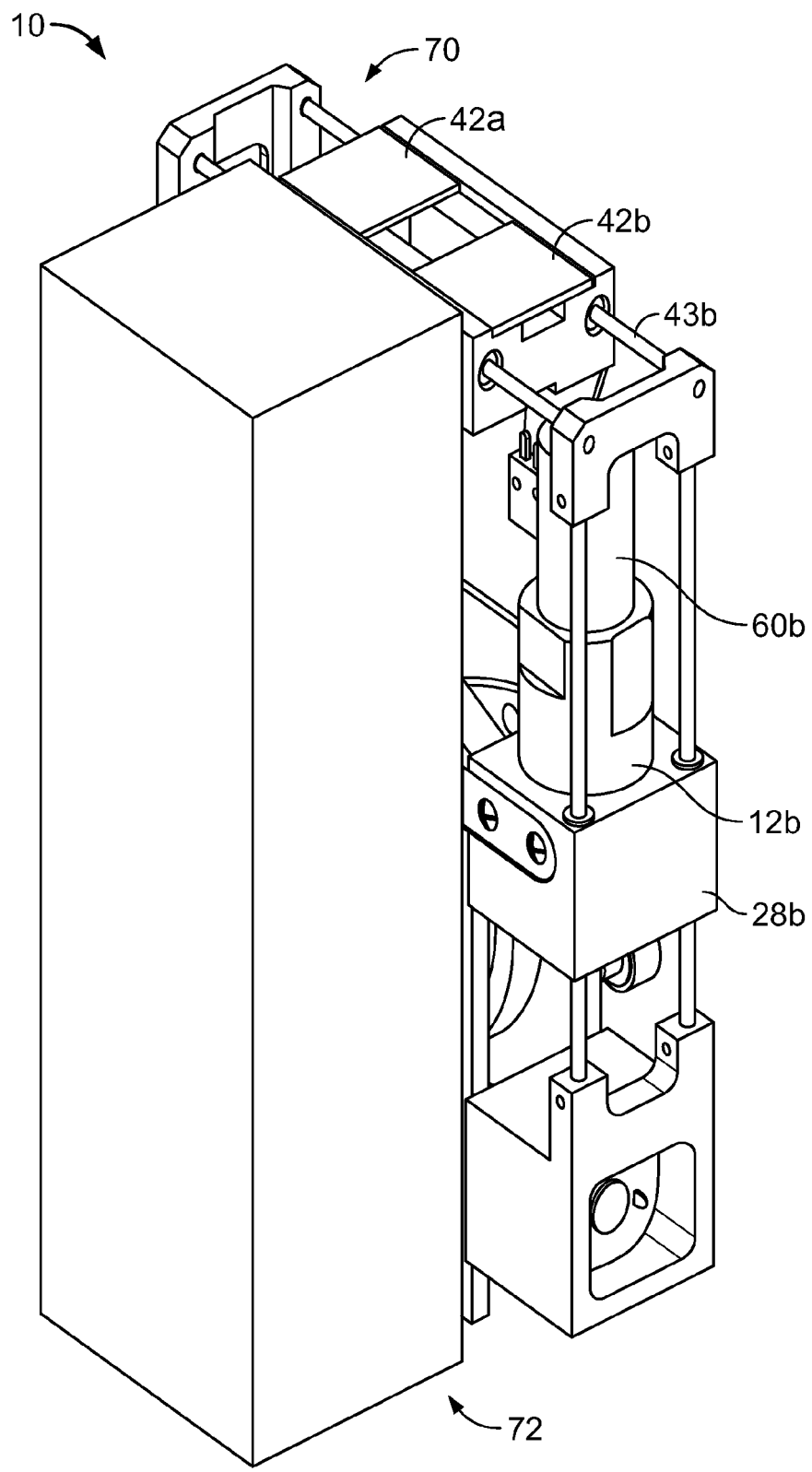
FIG. 10A is a perspective view of a charger device that includes the mechanism of FIG. 1, attached to a housing containing a charging circuit.
Figure 10B:
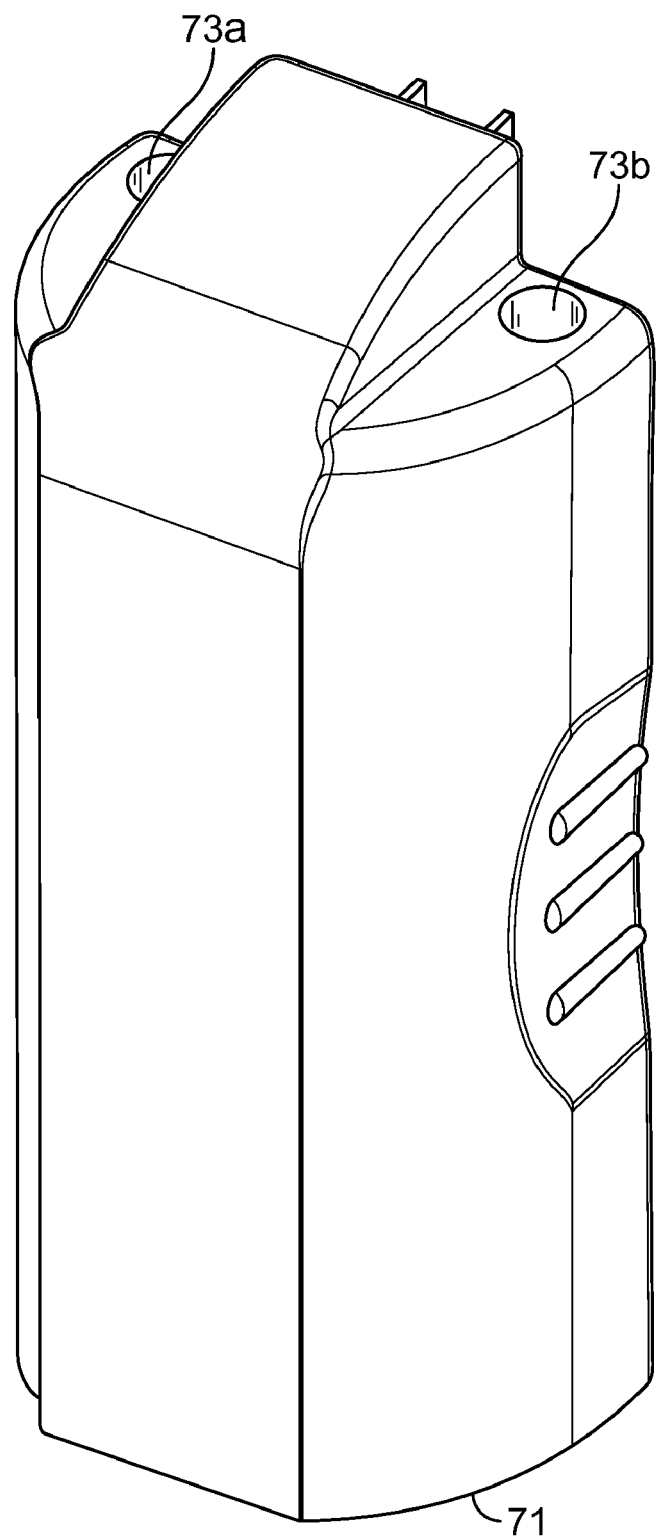
FIG. 10B is a perspective view of an exemplary embodiment of a charger casing enclosing the charger device of FIG. 10A.

Referring to FIGS. 10A and 10B, a battery charger device 70 that includes the automatic load/unload mechanism 10 is shown. The charger 70 includes a housing 72 in which a charging circuit (not shown in FIGS. 10A-B) is disposed. The charging circuit is electrically coupled to the contacts 42a and 42b. When the displaceable covers 42a and 42b are actuated to a position above the charging compartments 12a and 12b and come in electrical communication with the terminals of the batteries 60a and 60b received inside the charging compartments 12a and 12b, the charging circuit causes the charging operation to commence.

As shown in FIG. 10B, the battery charger device 70 is enclosed in charger casing 71. The casing 71 includes openings 73a and 73b leading, respectively, into the charging compartments 12a and 12b. A user places batteries, such as batteries 60a and 60b, through the openings 73a and 73b.

In some embodiments, the charger 70 is configured to charge a rechargeable battery to at least 90% of the battery's charge capacity in less than 15 minutes. In some embodiments, the charger 70 achieves a charge of at least 90% in approximately five (5) minutes. Other charging profiles are possible.

Figure 11:
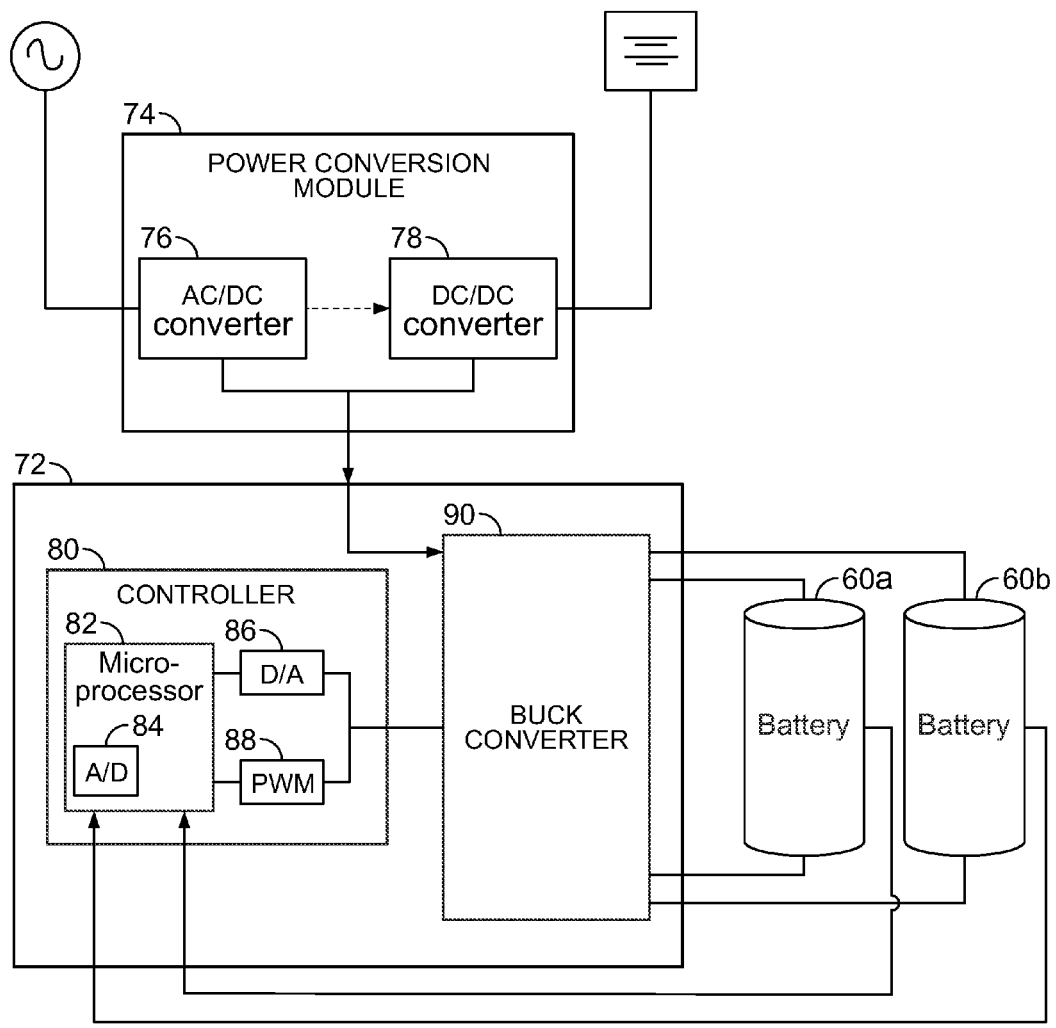
FIG. 11 is a block schematic of an exemplary embodiment of the charging circuit disposed in the housing of FIG. 10A.

FIG. 11 depicts an exemplary embodiment of the charging circuit charger 72. The charging circuit 72 is configured to initially apply a constant charging current to the rechargeable batteries, such as the batteries 60a and 60b, received in one of the charging compartments 12a of the load/unload mechanism 10. During the period in which a constant current is delivered to the battery (during this period the charger is said to be operating in constant current, or CC mode), the voltage of the battery 60a increases. When the voltage of the battery reaches a pre-determined upper limit voltage of, for example, 3.8V (this upper limit voltage is sometimes referred to as the crossover voltage), the charging circuit 72 is configured to apply to the battery 60a, for the remainder of the charging period, a voltage having this value. During the period that a constant voltage, substantially equal to the pre-determined crossover value, is applied to the battery 60a, the charging circuit 72 is said to be operating in constant voltage, or CV, mode.

The charging circuit 72 is coupled to a power conversion module 74. The power conversion module 74 includes an AC/DC converter 76 that is electrically coupled to an AC power source, external to the charger, such as a source providing power at a rating of 85V-265V and 50 Hz-60 Hz, and converts the AC power to a low D.C. voltage (e.g., 5-24V) and e.g., feeds this low D.C. voltage to, e.g., a DC-DC converter 78 to provide a level suitable for charging rechargeable batteries (e.g., DC voltages at levels of approximately between 3.7-4.2V for the rechargeable batteries having lithium-iron-phosphate electrochemical cell. Other types of cells may have different voltage levels.)

The charging circuit 72 includes a controller 80 that is configured to determine the charging current to be applied to the batteries 60a and 60b, apply to the batteries 60a and 60b a current substantially equal to the determined charging current, and terminate the charging current after a specified or pre-determined time period has elapsed. The controller 80 may also be configured to terminate the charging current once a pre-determined battery voltage or charge level has been reached. In some embodiments, the controller 80 regulates a buck converter 90 to apply a constant 12 C charge rate (i.e., a charge rate of 1 C corresponds to the current that would be required to charge a battery in one hours, and thus 12 C is a charge rate that would to charge the particular battery in approximately $\frac{1}{12}$ of an hour, i.e., five minutes.) Such a charge rate of 12 C is applied until a predetermined maximum charge voltage is reached, or a period of five (5) minutes has expired. Once the maximum charge voltage is reached, the controller 80 changes control modes and applies a constant voltage to the batteries 60a and 60b, until the pre-determined charge time has expired, e.g., 5 minutes.

In some embodiments, determination of the charging current to be applied to the batteries 60a and 60b may be based, at least in part, on user specified input provided through a user interface disposed, for example, on the casing 71 of the charger 70. Such a user interface may include, for example, switches, buttons and/or knobs through which a user may indicate, for example, the capacity of the of battery that is to be recharged. Additionally, in some embodiments, the interface may be configured to enable the user to specify other parameters germane to the charging process, such as, for example, the charging period (in circumstances where a longer charging period, e.g., 15 minutes to 1 hour, is desired.) To determine the specific charging current to use, a lookup table that indexes suitable charging currents corresponding to the user-specified parameters is accessed.

In some embodiments, determination of the charging current may be performed by identifying the capacity of the battery(s) placed in the charging compartment of the charger 70 using, for example, an identification mechanism that provides data representative of the battery capacity and/or battery type. A detailed description of an exemplary charger device that includes an identification mechanism based on the use of an ID resistor having a resistance representative of the battery's capacity is provided in the concurrently filed patent application entitled "Ultra Fast Battery Charger with Battery Sensing", the content of which is hereby incorporated by reference in its entirety. In some embodiments, determination of the charging current may be performed by measuring at least one of the battery's electric characteristics indicative of the capacity and/or type of battery (e.g., the battery's charging resistance.) A detailed description of an exemplary charger device that adaptively determines the charging current based on measured characteristics of the battery is provided in the concurrently filed patent application entitled "Adaptive Charger Device and Method", the content of which is hereby incorporated by reference in its entirety.

The controller 80 includes a processor device 82 configured to control the charging operations performed on the batteries 60a and 60b. The processor device 82 may be any type of computing and/or processing device, such as a PIC18F1320 microcontroller from Microchip Technology Inc. The processor device 82 used in the implementation of the controller 80 includes volatile and/or non-volatile memory elements configured to store software containing computer instructions to enable general operations of the processor-based device, as well as implementation programs to perform charging operations on the batteries 60a and 60b coupled to the charger 70, including such charging operations that achieve at least 90% charge capacity in less than fifteen (15) minutes. The processor device 82 includes an analog-to-digital (A/D) converter 84 with multiple analog and digital input and output lines. The controller 80 also includes a digital-to-analog (D/A) converter device 86, and/or a pulse-width modulator (PWM) 88 that receives digital signals generated by the processor device 82 and generates in response electrical signals that regulate the duty cycle of switching circuitry, such as the buck converter 90 of the charging circuit 72.

Figure 12:
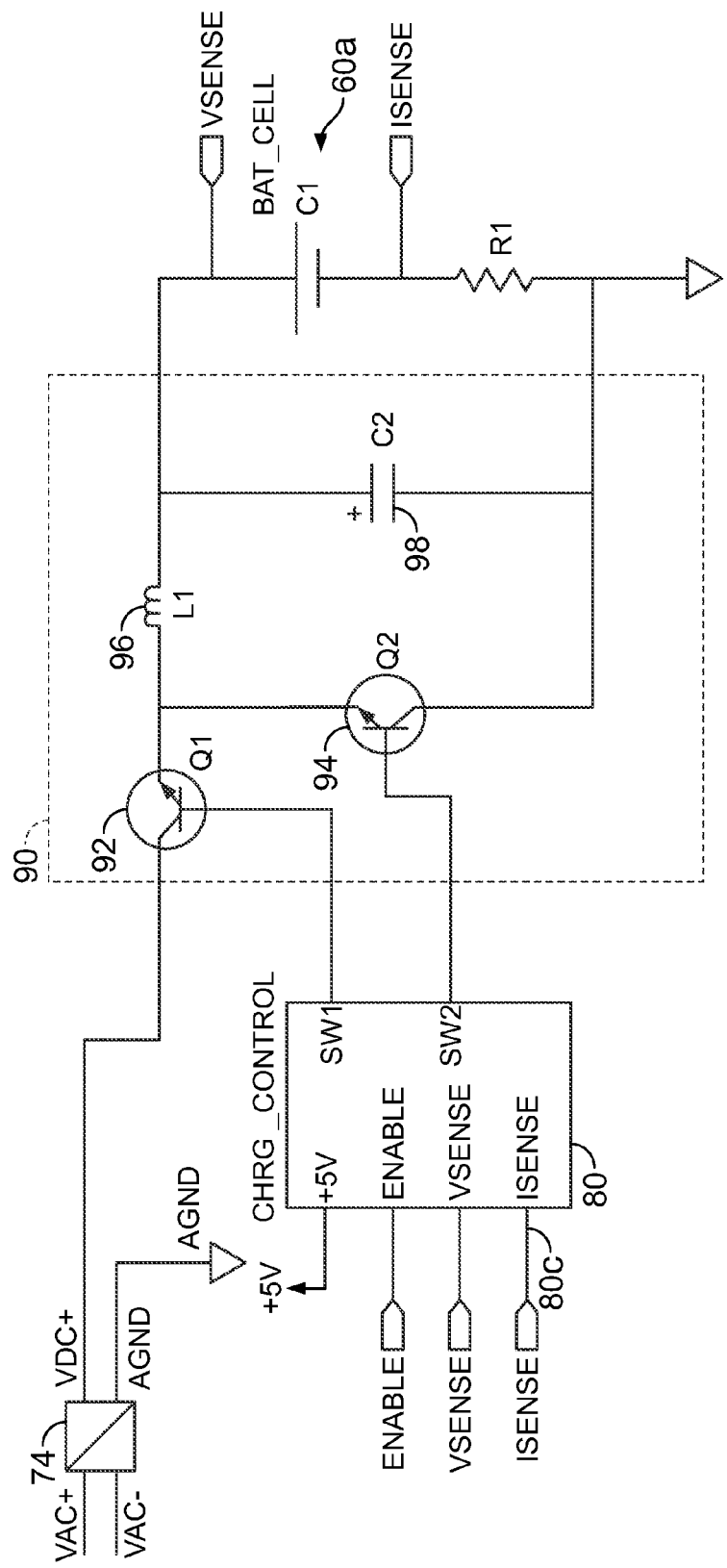
FIG. 12 is a circuit schematic of the charging circuit of FIG. 11.

FIG. 12 shows the buck converter 90 including two, e.g., Bi-Polar Junction Transistors (BJT's) 92 and 94 and an inductor 96 that stores energy when the power conversion module 74 is in electrical communication with the buck converter 90, and which discharges that energy as current during periods that the power conversion module 74 is electrically isolated from the buck converter 90 (for the sake of simplicity, the circuit schematic shows only the battery 60a.) The buck converter 90 shown in FIG. 12 also includes a capacitor 98 that is also used as an energy storage element. The inductor 96 and the capacitor 98 also act as output filters to reduce the switching current and voltage ripples at the output of the buck converter 90. Operation of a buck converter, such as the buck converter 90 shown in FIG. 12, is more particularly described in, for example, concurrently filed applications "Fast Battery Charger Device and Method," the content of which is hereby incorporated by reference in its entirety.

The transistor's on-period, or duty cycle, is initially ramped up from 0% duty cycle, while the controller or feedback loop measures the output current and voltage. Once the determined charging current is reached, the feedback control loop manages the transistor duty cycle using a closed loop linear feedback scheme, e.g., using a proportional-integral-differential, or PID, mechanism. A similar control mechanism may be used to control the transistor's duty cycle once the charger voltage output, or battery terminal voltage, reaches the crossover voltage.

Thus, the current provided by the power conversion module 74 during the on-period of the transistor 92, and the current provided by the inductor 96 and/or the capacitor 98 during the off-periods of the transistor 92 should result in an effective current substantially equal to the required charging current.

In some embodiments, the controller 80 periodically receives (e.g., every 0.1 second) a measurement of the current flowing through the batteries 60a and 60b as measured, for example, by a current sensor that communicates the measured value in one or both batteries via a terminal 80c (marked ISENSE) of the controller 80. Based on this received measured current, the controller 80 adjusts the duty cycle to cause an adjustment to the current flowing through the batteries 60a and 60b so that that current converges to a value substantially equal to the charging current level. The buck converter 90 is thus configured to operate with an adjustable duty cycle that results in adjustable current levels being supplied to the batteries 60a and 60b.

In addition to the voltage sensor and/or the current sensor, the charger 70 may include other sensors configured to measure other attributes of either the batteries 60a and 60b and/or the charger 70. For example, in embodiments in which thermal control of the charger 70 is required (e.g., for charger that have a charging period of more than 15 minutes), the charger 70 may include temperature sensors (e.g., thermistors) coupled to the batteries 60a and 60b and/or to a circuit board on which the charging circuit 72 may be disposed.

Figure 13:
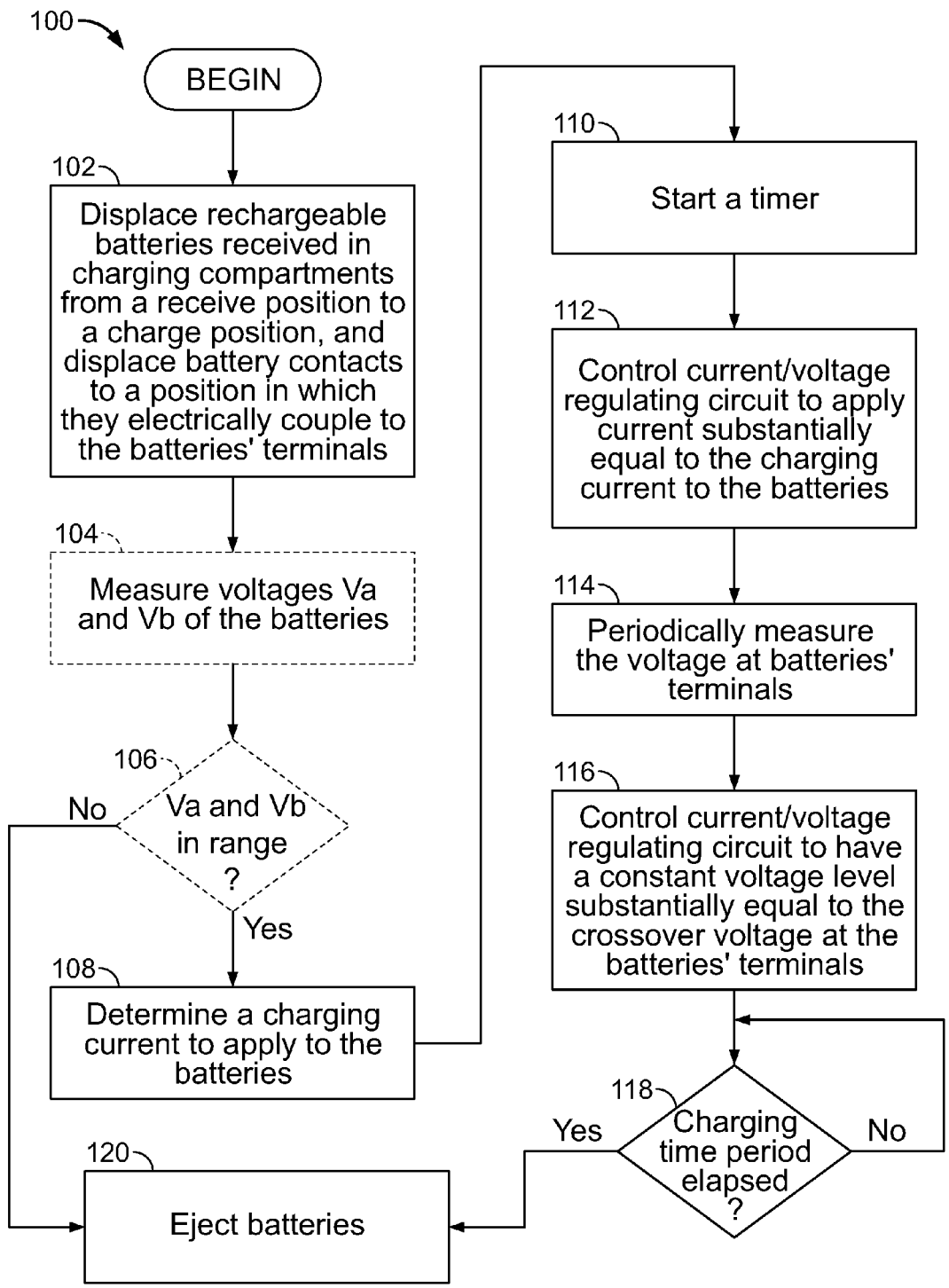
FIG. 13 is a flow diagram of an exemplary embodiment of operations performed during a charging cycle using the charger device of FIG. 10A.

FIG. 13 depicts an exemplary charging procedure 100 to recharge the rechargeable batteries 60a and 60b. The batteries 60a and 60b are placed through the openings 73a and 73b on the casing 71 enclosing the mechanism 10 and the circuit housing 72. The user may then initiate the charging cycle by pressing a 'START' button disposed on the casing 71. In some embodiments, a sensing mechanism may detect that batteries have been placed in the charging compartment and thus may initiate the charging cycle automatically.

With the charging cycle initiated, the motor 14 begins operation, and causes actuation of the actuator that controls the displacement of the stages 28a and 28b to displace, 102, the batteries 60a and 60b from a first position (i.e., the receiving position) to a second position (i.e., the charging position) in which a charging current is to be applied. In the exemplary embodiment described herein, the motor 14 causes rotation of a cam driver 16 that includes the oblong-shaped disc 22, which in turn actuates the arms 24a and 24b, via the cam follower 32, to displaced the stages 28a and 28b into the interior of the mechanism 10. The operation of the motor 14 also causes rotation of a second actuator 40 to actuate the arms 44a and 44b to displace the charger contacts 42a and 42b over the batteries 60a and 60a so that the contacts 42a and 42b contact the terminals of the batteries 60a and 60b.

After the batteries 60a and 60b have been displaced to their charge position, the 'charge position' limit switch 58a causes operation of the motor 14 to cease, thus halting the displacement of the stages 28a and 28b, and of the charger contacts 42a and 42b.

With the batteries now in their charge position, and the batteries' terminals in electrical communications with the electrical contacts of the contacts 42a and 42b, the charging process may proceed. Optionally, prior to commencing the charging procedure, the charger 70 determines whether certain fault conditions exist. For example, the charger 70 measures 104 the voltage $V_a$ and $V_b$ of the batteries 60a and 60b, respectively. The charger 70 determines 106, whether the measured voltages are within a predetermined range (e.g., between 2-3.8V.) In circumstances in which it is determined that the measured voltages, $V_a$ and $V_b$, of either of the batteries 60a and 60b are not within the predetermined acceptable ranges, thus rendering a charging operation under current conditions to be unsafe, the charger does not proceed with the charging operation, and the charging process may terminate. Under these circumstances, the batteries are unloaded 120, as described herein.

The charger 70 determines 108 a charging current and/or a charging period to be used to charge the batteries 60a and 60b based on information germane to the charging process, including the type of batteries, the charging period, the batteries' capacity, etc. For example, the charger 70 may be configured to determine a charging current to charge the batteries 60a and 60b to at least a 90% charge capacity in less than 15 minutes. In some embodiments, charging current suitable for longer charging periods (e.g., 1-4 hours), different battery capacities, and different charge levels, may be determined.

The information used to determine the charging current may be provided through a user interface disposed, for example, on the casing 71 of the charger 70. Additionally and/or alternatively, such information may be provided through an identification mechanism through which the batteries, for example, can communicate to the charger information representative of their characteristics (e.g., capacity, type.) In some embodiments, determination of the charging current to apply may be based on information obtained by measuring electrical characteristics of the batteries (e.g., charging resistance), and determining, based on such measurements, the type and/or capacity of the batteries 60*a* and 60*b*. If the charger 70 is configured to receive a particular type of battery having a particular type of capacity, the charger 70 uses a pre-determined charging current suitable for that particular battery and capacity. Determination of the charging current may be performed by accessing a lookup table that associates charging currents with different battery capacities, battery type, charging periods, etc.

Having determined the charging current to be applied to batteries 60*a* and 60*b*, a timer, configured to measure the pre-specified time period of the charging operation, is started 110. The timer may be, for example, a dedicated timer module of the processor 84, or it may be a counter that is incremented at regular time intervals measured by an internal or external clock of the processor 84.

A current/voltage regulating circuit, such as, for example, the buck converter 90 shown in FIG. 12, is controlled 112 to cause a constant current substantially equal to the determined current to be applied to the rechargeable batteries 60*a* and 60*b*. As explained, the charging current determined is used to generate a duty cycle signal, applied, for example, to the transistor 92 of the buck converter 90, to cause current substantially equal to the charging current to be applied to the battery 12. Thus, the controller's output signals are applied, for example, to the transistor 92 of the buck converter 90 to cause voltage from the power conversion module 74 to be applied to the batteries 60*a* and 60*b*. During the off-time of a particular duty cycle, the power conversion module 74 is cutoff from the batteries 60*a* and 60*b*, and the energy stored in the inductor 96 and/or capacitor 98 is discharged to the batteries as a current. The combined current applied from the power conversion module 74, and the current discharged from the inductor 96 and/or the capacitor 98 result in an effective current substantially equal to the determined charging current.

In some embodiments, the charger 70 implements a CC/CV charging process. Thus, in such embodiments, the voltage at the terminals of the batteries 60*a* and 60*b* is periodically measured 114 (e.g., every 0.1 seconds) to determine when the pre-determined upper voltage limit (i.e., the crossover voltage) has been reached. When the voltage at the terminals of the batteries 60*a* and 60*b* has reached the pre-determined upper voltage limit, e.g., 4.2V, the current/voltage regulating circuit is controlled 116 (e.g., through electrical actuation of the transistors 92 and 94) to have a constant voltage level substantially equal to the crossover voltage level maintained at the terminals of the batteries 60*a* and 60*b*.

After a period of time substantially equal to the charging time period has elapsed, as determined 118, or after a certain charge or voltage level has been reached (as may be determined through periodical measurements of the batteries 60*a* and 60*b*) the charging current applied to the batteries 60*a* and 60*b* is terminated (for example, by ceasing electrical actuation of the transistor 92 to cause power delivered from the power conversion module 74 to be terminated).

The batteries 60*a* and 60*b* can be removed 120 from the charger by resuming operation of the motor 14. Operation of the motor 14 causes the spur gear 18 to resume rotation, thus causing the cam drivers 16 and 40 to actuate the respective arms that they act upon. In the ordered sequence of operations implemented by the two actuators, the cam driver 16, which includes the rotating oblong-shaped disc 22, actuates the arms 24*a* and 24*b* to slightly displace the batteries to enable the charger contacts 42*a* and 42*b* to begin retracting from the position over the charging compartments 12*a* and 12*b* without being damaged. The cam driver 40, which includes the oblong-shaped disc 48 and the annular disc 46 that together define the race-track channel 50, actuate the arms 44*a* and 44*b* to retract the charger contacts 42*a* and 42*b* to substantially the center of the rod rails 43*a* and 43*b*. The rotating oblong-shaped disc 22 actuates the arms 24*a* and 24*b* to displace the stages 28*a* and 28*b* and thus move the batteries 60*a* and 60*b* to their unload position. At that point the 'unload' limit switch is engaged and operation of the motor 14 ceases and the batteries 60*a* and 60 can be removed by a user.

Additional exemplary embodiments charging circuits and charging procedures are described, for example, in the concurrently filed patent applications entitled "Fast Battery Charger Device and Method" and "Lithium Iron Phosphate Ultra Fast Battery Charger", the contents of all of which are hereby incorporated by reference in their entireties.

OTHER EMBODIMENTS

A number of embodiments of the invention have been described. For example the charging compartments can include a movable base portion and fixed, e.g., cylindrical sidewalls, in which the movable base portion is actuated by the mechanism 10 to displace the battery between first and second positions, while the sidewalls of the charging compartments remain stationary. Nevertheless, it will be understood that various modifications may be made without departing from the spirit and scope of the invention. Accordingly, other embodiments are within the scope of the following claims.

What is claimed is:

1. A mechanism for loading/unloading one or more rechargeable batteries, the mechanism comprising:
   one or more charging compartments configured to receive one or more rechargeable batteries; and
   a first actuator coupled to the one or more charging compartments, the first actuator configured to cause the one or more charging compartments to be displaced from a first position to a second, different position.

2. A mechanism for loading/unloading one or more rechargeable batteries, the mechanism comprising:
   one or more charging compartments configured to receive one or more rechargeable batteries; and
   an actuator configured to cause the one or more charging compartments to be spatially displaced from a first position that permits user insertion or removal of a battery or batteries into or out of the one or more charging compartments, to a second, different, position in which a charging operation can be initiated and which prevents user accessibility to the battery or batteries while in the second position.

3. The mechanism of claim 2, further comprising:
one or more slide-able displaceable contacts; and
a second actuator coupled to the slide-able displaceable contacts and configured to cause the one or more displaceable contacts to slide over the one or more charging compartments in a charging position and slide away from the one or more charging compartments in a non-charging position.

4. The mechanism of claim 3, wherein the first actuator includes a first cam mechanically coupled to a first set of one or more displaceable arms, and wherein the second actuator includes a second cam coupled to a second set of one or more displaceable arms.

5. The mechanism of claim 4, wherein the one or more charging compartments are in mechanical communication with the first set of one or more displaceable arms, and wherein the one or more charging compartments are configured to be displaced in response to displacement of the first set of the one or more displaceable arms.

6. The mechanism of claim 4, wherein the first cam includes a first oblong-shaped disc.

7. The mechanism of claim 4, wherein the one or more displaceable contacts are in mechanical communication with the second set of one or more arms, and wherein the one or more displaceable contacts are configured to be displaced in response to displacement of the second set of the one or more displaceable arms.

8. The mechanism. of claim 4, wherein the second cam includes an annular disc and a second oblong-shaped disc disposed substantially in the space defined by the annular disc, the annular disc and the second oblong-shaped disc defining a channel configured to receive a cam follower.

9. The mechanism of claim 4, further comprising:
a motor;
a spur gear, on which the first cam and the second cam are mounted, and
a worm gear mechanically connected to the motor and in mechanical contact with the spur gear, with the worm gear configured to transfer rotational motion from the motor when the motor is operating on the spur gear.

10. The mechanism of claim 3, wherein the first actuator and the second actuator are configured to perform an ordered sequence of actuation operations.

11. The mechanism of claim 3, further comprising:
a charging module configured to apply charging current to the one or more contacts.

12. The mechanism of claim 9, further comprising:
a first limit switch configured to cause the motor to stop actuation when the one or more batteries reaches the second position.

13. The mechanism of claim 9, further comprising:
a second limit switch configured to cause the motor to stop actuation when the one or more batteries returns to the first position.

14. A charger device configured to charge one or more rechargeable batteries, the device comprising:
a load/unload mechanism comprising:
one or more charging compartments configured to receive one or more rechargeable batteries; and
a first actuator configured to cause at least a portion of the one or more charging compartments to be displaced from a first position to permit insertion or removal of a battery or batteries to a second, different position in which a charging operation can be initiated.

15. The device of claim 14, further comprising:
one or more displaceable contacts; and
a second actuator configured to cause the one or more contacts, coupled to a charging compartment, to be displaced between a contact position and a non-contact position with the one or more rechargeable batteries.

16. The device of claim 15, wherein the first actuator includes a first cam mechanically coupled to a first set of one or more displaceable arms, and wherein the second actuator includes a second cam coupled to a second set of one or more displaceable arms.

17. The device of claim 16, wherein one or more charging compartments are in mechanical communication with the first set of one or more displaceable arms, and wherein the one or more charging compartments are configured to be displaced in response to displacement of the first set of the one or more displaceable arms.

18. The device of claim 16, wherein the one or more displaceable contacts are in mechanical communication with the second set of one or more arms, and wherein the one or more displaceable contacts are configured to be displaced in response to displacement of the second set of the one or more displaceable arms.

19. The device of claim 16, further comprising:
a motor;
a spur gear, the first cam and the second cam being mounted on the spur gear; and
a worm gear mechanically connected to the motor and in mechanical contact with the spur gear, with the worm gear configured to transfer rotational motion from the motor when the motor is operating on the spur gear.

20. The device of claim 15, wherein the first actuator and the second actuator are configured to perform an ordered sequence of actuation operations.

21. A method for charging one or more rechargeable batteries, the method comprising:
receiving the one or more batteries in corresponding one or more charging compartments located in a first position;
causing the one or more charging compartments to be displaced from the first position to a second, different position;
determining a current level to apply to the one or more batteries; and
applying a charging current having substantially the determined current level to the one or more batteries while the one or more charging compartments are in the second, different position.

22. The method of claim 21, wherein causing the one or more batteries to be displaced comprises:
actuating a first-displacement mechanism in mechanical communication with the one or more charging compartments using a first actuator at a first time.

23. The method of claim 22, further comprising displacing charger contacts configured to electrically couple to terminals of the one or more rechargeable batteries to a position substantially over the one or more charging compartments.

24. The method of claim 23, wherein displacing the charger contacts comprises:
actuating a second displacement mechanism in mechanical communication with the charger contacts using a second actuator at a second time which is different from the first time.

* * * * *